(12) United States Patent
Cho

(10) Patent No.: US 10,027,178 B1
(45) Date of Patent: Jul. 17, 2018

(54) WIRELESS POWER TRANSMITTING AND RECEIVING DEVICE, APPARATUS INCLUDING THE SAME, AND METHOD

(71) Applicant: SAMSUNG ELECTRO-MECHANICS CO., LTD., Suwon-si (KR)

(72) Inventor: Sang Ho Cho, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/903,731

(22) Filed: Feb. 23, 2018

Related U.S. Application Data

(63) Continuation of application No. 15/089,717, filed on Apr. 4, 2016, now Pat. No. 9,935,501.

(30) Foreign Application Priority Data

Apr. 10, 2015 (KR) .................. 10-2015-0051131
Jul. 8, 2015 (KR) .................. 10-2015-0097431

(51) Int. Cl.
*H01F 27/42* (2006.01)
*H01F 37/00* (2006.01)
*H01F 38/00* (2006.01)
*H02J 50/12* (2016.01)
*H02J 50/90* (2016.01)

(52) U.S. Cl.
CPC .............. *H02J 50/12* (2016.02); *H02J 50/90* (2016.02)

(58) Field of Classification Search
USPC ........................................................ 307/104
See application file for complete search history.

(56) References Cited

U.S. PATENT DOCUMENTS

| | | | |
|---|---|---|---|
| 6,538,909 B2 | 3/2003 | Goodarzi et al. | |
| 8,338,991 B2 | 12/2012 | Von Novak et al. | |
| 8,716,977 B2 | 5/2014 | Walley et al. | |
| 8,942,624 B2 | 1/2015 | Singh et al. | |
| 8,975,772 B2 | 3/2015 | Lakirovich et al. | |
| 9,030,051 B2 | 5/2015 | Muratov | |
| 9,748,774 B2 | 8/2017 | Van Den Brink et al. | |
| 9,768,622 B2* | 9/2017 | Hayashi ................. | H02J 5/005 |

(Continued)

FOREIGN PATENT DOCUMENTS

| KR | 10-2013-0013092 A | 2/2013 |
|---|---|---|
| KR | 10-2013-0032208 A | 4/2013 |

(Continued)

OTHER PUBLICATIONS

Korean Office Action dated Dec. 1, 2016 in counterpart Korean Patent Application No. 10-2005-0097431. (12 pages in Korean with English translation).

*Primary Examiner* — Adam Houston
(74) *Attorney, Agent, or Firm* — NSIP Law

(57) ABSTRACT

A wireless power transmitting and receiving device includes: a coil including a first section having a first number of turns and configured to receive power and a second section having a second number of turns different from the first number of turns and configured to transmit power and a converting and rectifying unit configured to: rectify the power received through the coil, convert externally-supplied power into alternating current power, and apply the alternating current power to the coil.

16 Claims, 24 Drawing Sheets

(56) References Cited

U.S. PATENT DOCUMENTS

| | | |
|---|---|---|
| 9,772,401 B2 | 9/2017 | Widmer et al. |
| 9,899,864 B2* | 2/2018 | Blakely ............... H02J 7/025 |
| 2011/0254379 A1* | 10/2011 | Madawala ............ H02J 5/005 |
| | | 307/104 |
| 2012/0187772 A1* | 7/2012 | Teggatz ............. H04B 5/0031 |
| | | 307/104 |
| 2013/0285463 A1* | 10/2013 | Covic ................ H01F 27/346 |
| | | 307/104 |
| 2014/0340044 A1 | 11/2014 | Kim et al. |
| 2015/0001950 A1 | 1/2015 | Chung et al. |
| 2015/0001958 A1* | 1/2015 | Abe .................... H02J 5/005 |
| | | 307/104 |
| 2015/0028689 A1 | 1/2015 | Arisawa |
| 2015/0084431 A1* | 3/2015 | Yeh .................... H02J 7/0044 |
| | | 307/104 |
| 2015/0137750 A1* | 5/2015 | Kirby ................... H02J 5/005 |
| | | 320/108 |
| 2015/0214747 A1* | 7/2015 | Abe .................... H01F 38/14 |
| | | 307/104 |
| 2016/0056664 A1 | 2/2016 | Partovi |
| 2016/0089985 A1* | 3/2016 | Murayama ............ H02J 50/12 |
| | | 307/10.1 |
| 2016/0126750 A1* | 5/2016 | Yasuda ................ H02J 7/0042 |
| | | 307/104 |
| 2016/0181855 A1 | 6/2016 | Muurinen et al. |
| 2016/0197492 A1 | 7/2016 | Fujita et al. |
| 2016/0372957 A1* | 12/2016 | Blakely ................ H02J 50/80 |
| 2016/0373027 A1* | 12/2016 | Blakely ................ H02J 50/80 |
| 2017/0222485 A1* | 8/2017 | Covic ................ H01F 27/346 |
| 2017/0338854 A1* | 11/2017 | Perumana ............. H04B 1/56 |
| 2018/0078761 A1* | 3/2018 | Bolea ................ A61N 1/3606 |

FOREIGN PATENT DOCUMENTS

| | | |
|---|---|---|
| KR | 10-2014-0028393 A | 3/2014 |
| KR | 10-2014-0129897 A | 11/2014 |
| KR | 10-2014-0134925 A | 11/2014 |
| WO | WO 2013/042866 A1 | 3/2013 |

* cited by examiner

WIRELESS POWER TRANSMITTING AND RECEIVING DEVICE, APPARATUS INCLUDING THE SAME, AND METHOD

CROSS-REFERENCE TO RELATED APPLICATIONS

This application is a continuation of U.S. patent application Ser. No. 15/089,717, filed on Apr. 4, 2016, which claims the benefit under 35 USC 119(a) of Korean Patent Application No. 10-2015-0051131, filed on Apr. 10, 2015, and Korean Patent Application No. 10-2015-0097431, filed on Jul. 8, 2015, in the Korean Intellectual Property Office, the entire disclosures of which are incorporated herein for all purposes.

BACKGROUND

1. Field

The present disclosure relates to a wireless power transmitting and receiving device and an apparatus including the wireless power transmitting and receiving device.

2. Description of Related Art

Wireless power transfer technology has been widely applied to chargers of communications apparatuses, portable apparatuses, and various home appliances.

Since portable apparatuses have seen increasing use, the necessity for the batteries of portable apparatuses to have large capacities and the necessity for portable apparatuses to be able to be charged without spatial limitations has increased.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

A wireless power transmitting and receiving device includes a coil including a first section having a first number of turns and configured to receive power; and a second section having a second number of turns different from the first number of turns and configured to transmit power; and a converting and rectifying unit configured to: rectify the power received through the coil; convert externally-supplied power into alternating current power; and apply the alternating current power to the coil.

The first number of turns may be greater than the second number of turns.

The converting and rectifying unit may be electrically connected to ends of the coil in a receiving mode in which the power is received by the coil and the converting and rectifying unit may be electrically connected to a first end of the coil and a tab disposed between the ends of the coil in a transmitting mode in which the power is transmitted by the coil.

The coil may include a first terminal electrically connected to the converting and rectifying unit in a receiving mode in which the power is received by the coil and in a transmitting mode in which the power is transmitted by the coil; a second terminal electrically connected to the converting and rectifying unit in the receiving mode; and a third terminal electrically connected to the converting and rectifying unit in the transmitting mode and disposed between the first terminal and the second terminal.

The wireless power transmitting and receiving device may further include: a first switch electrically connected to the second terminal, configured to be turned on in the receiving mode and turned off in the transmitting mode; a first capacitor electrically connected between the first switch and a first node; a second capacitor electrically connected between the first node and the first terminal; a second switch electrically connected to the third terminal, configured to be turned off in the receiving mode, and turned on in the transmitting mode; and a third capacitor electrically connected between the second switch and a second node.

The converting and rectifying unit may include a rectifying unit electrically connected between the first node and the first terminal and, in the receiving mode, configured to rectify a voltage; and a converting unit electrically connected between the second node and the first terminal, and, in the transmitting mode, configured to convert a voltage of externally-supplied power into alternating current voltage, and configured to output the alternating current voltage to the second node and the first terminal.

The converting unit may include a first transmission transistor electrically connected between a third node to which the externally-supplied power is supplied and the second node and configured to be turned on and off periodically; a second transmission transistor electrically connected between the second node and a ground and configured to be turned on and off complementarily to the first transmission transistor; a third transmission transistor electrically connected between the third node and the first terminal and configured to be turned on and off simultaneously with the second transmission transistor; and a fourth transmission transistor electrically connected between the first terminal and the ground and configured to be turned on and off simultaneously with the first transmission transistor.

The rectifying unit may include: a first reception transistor electrically connected between a third node to which the rectified voltage is applied and the first node, and configured to be turned on if a magnitude of current flowing from the coil to the rectifying unit is greater than a first value, and turned off if the magnitude of the current is less than a second value; a second reception transistor electrically connected between the first node and a ground, configured to be turned on if the magnitude of the current flowing from the coil to the rectifying unit is less than a third value, and turned off if the magnitude of the current is greater than a fourth value; a third reception transistor electrically connected between the third node and the first terminal and configured to be turned on and off simultaneously with the second reception transistor; and a fourth reception transistor electrically connected between the first terminal and the ground and configured to be turned on and off simultaneously with the first reception transistor.

The wireless power transmitting and receiving device may further include: a first capacitor electrically connected to a first node; a second capacitor electrically connected between the first node and the first terminal; and a switch configured to electrically connect the first capacitor to the second terminal in the receiving mode and electrically connect the first capacitor to the third terminal in the transmitting mode.

The converting and rectifying unit may include a bridge circuit electrically connected to the first node and the first terminal, configured to: rectify a voltage between the first node and the first terminal and output the rectified voltage in the receiving mode; and convert a voltage of externally-supplied power into alternating current voltage and output the alternating current voltage to the first node and the first terminal in the transmitting mode; a voltage regulator configured to receive the rectified voltage and output a charging voltage in the receiving mode; and a switch device electrically connected to the voltage regulator in parallel, configured to be turned on in the transmitting mode, and transfer the externally-supplied power to the bridge circuit.

The bridge circuit may include: a first transmission and reception transistor electrically connected between the first node and a second node to which the rectified voltage is configured to be output; a second transmission and reception transistor electrically connected between the first node and a ground; a third transmission and reception transistor electrically connected between the second node and the first terminal; and a fourth transmission and reception transistor electrically connected between the first terminal and the ground.

In the transmitting mode: the first transmission and reception transistor and the fourth transmission and reception transistor may be configured to be turned on and off simultaneously; the second transmission and reception transistor and the third transmission and reception transistor may be configured to be turned on and off simultaneously; and the first transmitting and receiving transistor and the second transmitting and receiving transistor may be configured to be turned on and off complementarily with each other; and in the receiving mode: the first transmission and reception transistor and the fourth transmission and reception transistor may be configured to be turned on and off simultaneously; the second transmission and reception transistor and the third transmission and reception transistor may be configured to be turned on and off simultaneously; the first transmission and reception transistor may be configured to be turned on if a magnitude of current flowing from the coil to the converting and rectifying unit is greater than a first value and turned off if the magnitude of the current is less than a second value; and the second transmission and reception transistor may be configured to be turned on if the magnitude of the current flowing from the coil to the converting and rectifying unit is less than a third value and turned off if the magnitude of the current is greater than a fourth value.

The first number of turns may be less than the second number of turns.

The converting and rectifying unit may be: electrically connected to ends of the coil in a receiving mode in which the power is received; electrically connected to a tab disposed between the ends of the coil; and may be configured to apply alternating current power to a first end of coil and the tab using boosted power obtained by boosting externally input power in a transmitting mode in which the power is transmitted wirelessly.

An apparatus includes: a coil including: a first section having a first number of turns and configured to receive power; and a second section having a second number of turns different from the first number of turns and configured to transmit power; a converting and rectifying unit configured to: rectify the power received through the coil; convert externally-supplied power into alternating current power; and apply the alternating current power to the coil; and a power unit configured to: receive charging power output by the converting and rectifying unit and store electrical power in a receiving mode in which the power is received by the coil; and supply the power to the converting and rectifying unit in a transmitting mode in which the power is transmitted by the coil.

The first number of turns may be greater than the second number of turns.

A method of operating a wireless power transmitting and receiving device including: determining whether a power receiving device is present; setting a transmitting or receiving mode based on the if the power receiving device is present; and outputting a control signal such that the wireless power transmitting and receiving device operates in a transmitting mode or receiving mode based on the mode that is set.

The method may further include: in the transmitting mode, transmitting power to the power receiving device using a coil.

The method may further include: in the receiving mode: receiving power using the coil; determining whether a magnitude of the received power is greater than or less than a value; and exiting the receiving mode if the magnitude of the received power is less than the value.

The method may include: rectifying the power received through the coil in the transmitting mode; and converting externally-supplied power to alternating current power and applying the alternating current power to the coil in the receiving mode.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
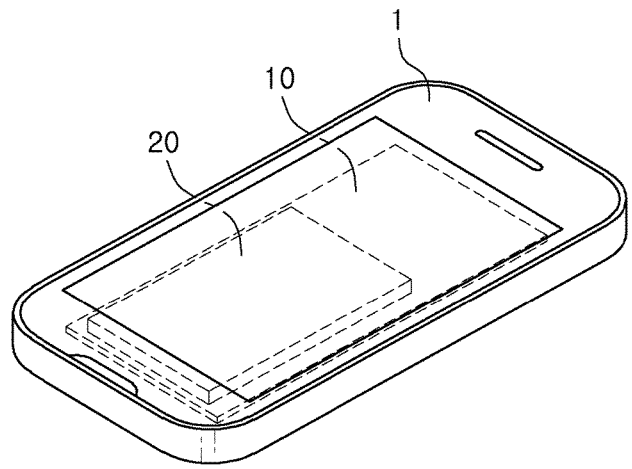
FIG. 1 is a diagram illustrating an apparatus including an example of a wireless power transmitting and receiving device.

Hereinafter, embodiments of the present inventive concept will be described as follows with reference to the attached drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the specification, it will be understood that when an element is referred to as being "connected to," or "coupled to" another element, it can be directly "connected to," or "coupled to" the other element or other elements intervening therebetween may be present. In contrast, when an element is referred to as being "directly connected to," or "directly coupled to" another element, there may be no elements intervening therebetween. Like numerals refer to like elements throughout. As used herein, the term "and/or" includes any and all combinations of one or more of the associated listed items.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram of an example of an apparatus 1 including a wireless power transmitting and receiving device 10. The apparatus 1 includes the wireless power transmitting and receiving device 10 and a power unit 20.

The wireless power transmitting and receiving device 10 may receive power transmitted wirelessly, output charging power, receive a supply of power stored in a battery, and/or transmit power wirelessly. The wireless power transmitting and receiving device 10 may include a transmitting and receiving coil for transmitting and receiving power and a bridge circuit for rectifying received power or supplying alternating current power to the transmitting and receiving coil. The transmitting and receiving coil and the bridge circuit may be disposed in a printed circuit board (PCB) or a flexible printed circuit board (FPCB).

The power unit 20 may include a battery, may store electrical power, and may supply power to various elements of the apparatus 1 including the wireless power transmitting and receiving device 10 by using the stored electrical power.

Although apparatus 1 may include the wireless power transmitting and receiving device 10, as illustrated in FIG. 1, elements included in the wireless power transmitting and receiving device 10 may be disposed separately from each other, and/or may be integrally formed with the apparatus 1 in various ways. For example, the transmitting and receiving coil of the wireless power transmitting and receiving device 10 may be disposed in a case separate from or integral to the apparatus 1, and the bridge circuit may be disposed in a PCB present inside or outside apparatus 1.

Figure 2:
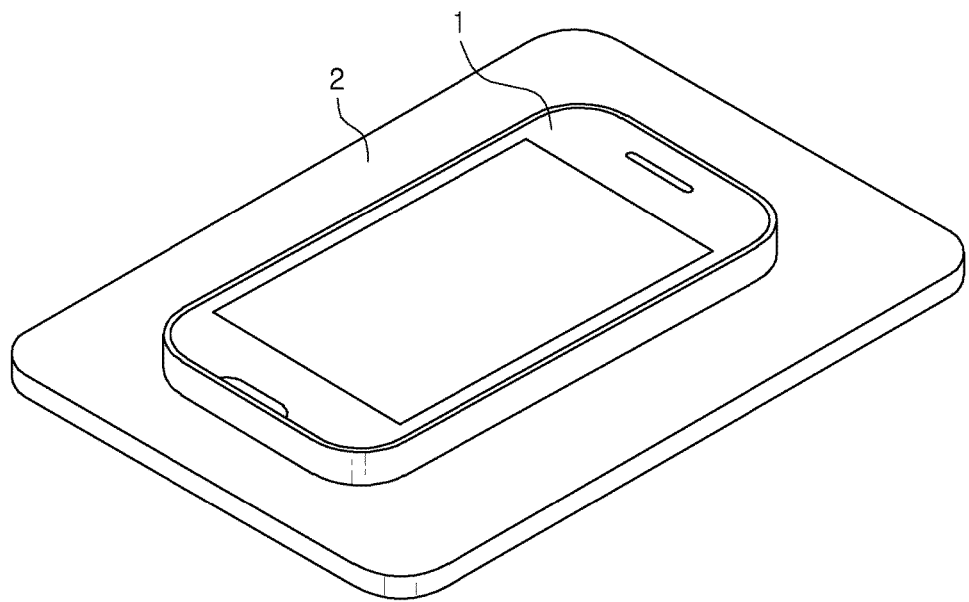
FIG. 2 is a diagram illustrating an example of a wireless power transmitting device wirelessly for supplying power to the apparatus of FIG. 1.

FIG. 2 is a diagram of an example of wireless power transmitting device 2 wirelessly supplying power to the apparatus 1 of FIG. 1. In FIG. 2, reference numeral 1 denotes the apparatus 1 including the wireless power transmitting and receiving device, and reference numeral 2 denotes the wireless power transmitting device.

As shown in FIG. 2, when the apparatus 1 is to be charged, a user may dispose the apparatus 1 adjacently to the wireless power transmitting device 2. Since device 2 may wirelessly transmit power, that the apparatus 1 may receive the power transmitted wirelessly and charge a battery inside the apparatus 1 by using the received power.

Figure 3:
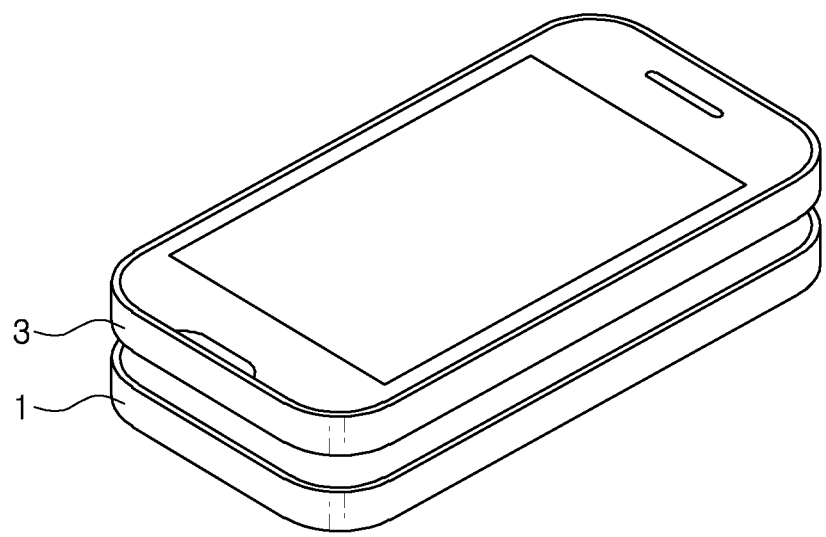
FIG. 3 is a diagram illustrating an example of the apparatus of FIG. 1 wirelessly transmitting power to another apparatus.

FIG. 3 is a diagram of an example of apparatus 1 of FIG. 1 wirelessly transmitting power to another apparatus 3. In FIG. 3, reference numeral 1 denotes the apparatus 1 (a first apparatus) including the wireless power transmitting and receiving device, and reference numeral 3 denotes an other apparatus (a second apparatus).

The apparatus 1 and the other apparatus 3 may both be mobile apparatuses such as a smartphone, etc., but are not limited thereto and could be any mobile or non-mobile device. As shown in FIG. 3, the apparatus 1 be disposed adjacently to the other apparatus 3, thereby charging the other apparatus 3 by using the apparatus 1. That is, the wireless power transmitting and receiving device included in the apparatus 1 may transmit power wirelessly, and a wireless power receiving device included in the other apparatus 3 may receive the power transmitted wirelessly, thereby performing wireless power charging. A user may arrange the apparatus 1 and the other apparatus 3 to have a desired state of charging.

Additionally or alternatively, the other apparatus 3 may include a wireless power transmitting and receiving device. In this configuration, the other apparatus 3 may transmit power wirelessly, and the apparatus 1 may receive the power transmitted wirelessly.

Figure 4:
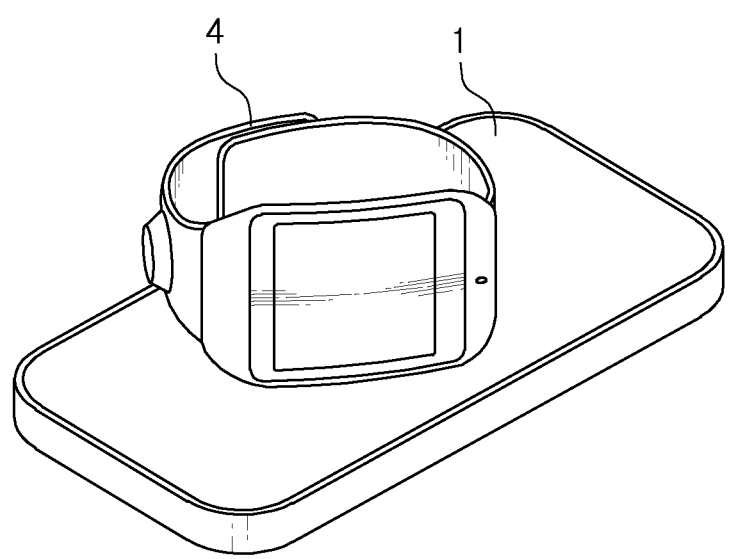
FIG. 4 is a diagram illustrating an example of the apparatus of FIG. 1 wirelessly transmitting power to a wearable apparatus.

FIG. 4 is a diagram illustrating an example of apparatus 1 of FIG. 1 wirelessly transmitting power to a wearable apparatus 4. In FIG. 4, reference numeral 1 denotes the apparatus 1 including the wireless power transmitting and receiving device, and reference numeral 4 denotes the wearable apparatus.

As shown in FIG. 4, the apparatus 1 is disposed adjacent to the wearable apparatus 4, thereby charging the wearable apparatus 4 by using the apparatus 1. A user may arrange the apparatus 1 and the wearable apparatus 4 to have a desired state of charging.

Although FIGS. 2, 3, and 4 illustrate the apparatus 1 receiving power transmitted wirelessly or transmitting the power wirelessly, the wireless power transmitting and receiving device (e.g. apparatus 3 or wearable apparatus 4) and the apparatus 1 including the wireless power transmitting and receiving device may receive or transmit power by various methods other than the methods described with reference to FIGS. 2, 3, and 4 above.

Figure 5:
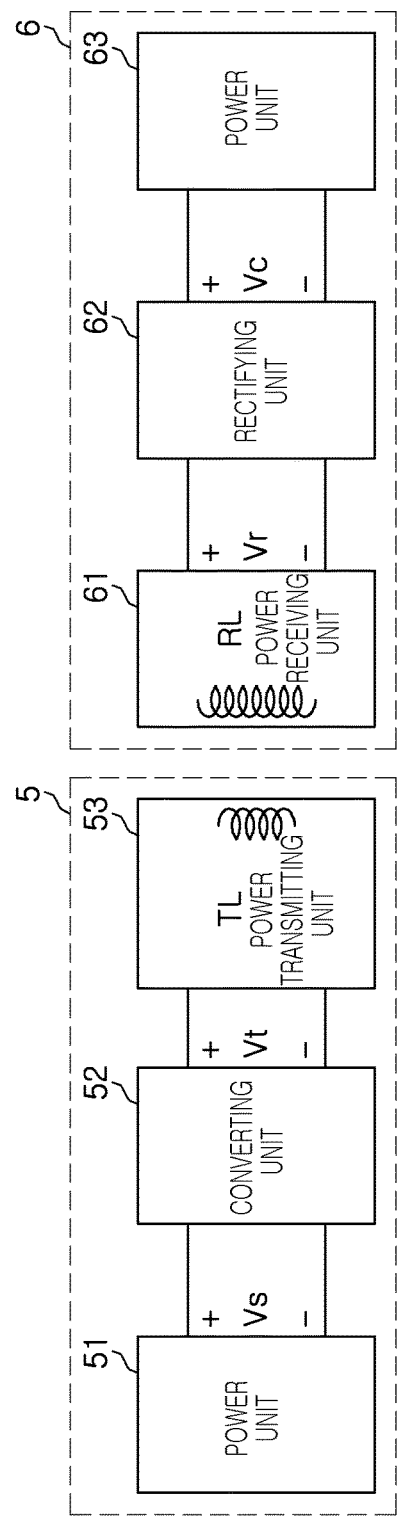
FIG. 5 is a schematic diagram illustrating and example of power transmission and reception between a wireless power transmitting device and a wireless power receiving device.

FIG. 5 is a schematic diagram illustrating an example of power transmission and reception between a wireless power transmitting device 5 and a wireless power receiving device 6. The wireless power transmitting device 5 includes a power unit 51, a converting unit 52, and a power transmitting unit 53. The wireless power receiving device 6 includes a power receiving unit 61, a rectifying unit 62, and a power unit 63.

The power unit 51 may supply power voltage Vs to the converting unit 52. The converting unit 52 may convert the power voltage Vs to output an alternating current voltage Vt. The power transmitting unit 53 includes a power transmitting coil TL, may receive a supply of the alternating current voltage Vt, and may transmit power wirelessly.

The power receiving unit 61 includes a power receiving coil RL, may receive the power transmitted wirelessly, and may output a receiving voltage Vr. The rectifying unit 62 may rectify the receiving voltage Vr to output a charging voltage Vc. The power unit 63 may include a battery, may receive a supply of the charging voltage Vc, and may store electrical power.

A magnitude of the charging voltage Vc may have a value lower than a maximum value of the receiving voltage Vr. The rectifying unit 62 may include a voltage regulator such as a low drop out (LDO) regulator to uniformly output the magnitude of the charging voltage Vc and thus, the magnitude of the charging voltage Vc may have the value lower than the maximum value of the receiving voltage Vr. Therefore, the receiving voltage Vr may have a proper magnitude in order to generate the charging voltage Vc. A magnitude of the receiving voltage Vr may be different according to an operating frequency of the converting unit 52, or any of the other units. That is, wireless power transfer may be smoothly performed when the operating frequency varies within a proper range.

Although shown as separate coils in FIG. 5, a coil single unit (including one or more coils and/or a single coil having one or more sections) may be used to perform as the wireless power transmitting device 5 and as wireless power receiving device 6 simultaneously. The number of turns of a coil used in a transmitting mode in which power is transmitted wirelessly may be regulated differently from the number of turns of a coil used in a receiving mode in which the wirelessly transmitted power is received. Additionally or alternatively, a voltage supplied from the power unit 51 and/or 63 may be boosted in the transmitting mode in which power is transmitted wirelessly. Therefore, the operating frequency of the converting unit 52 may be set within the proper range, and as a result, the wireless power transfer may be more smoothly performed.

The wireless power transmitting device 2 of FIG. 2 may include the same configuration as, for example, the wireless power transmitting device 5 of FIG. 5. The other apparatus 3 of FIG. 3 and the wearable apparatus 4 of FIG. 4 may include, for example, the same configuration as the wireless power receiving device 6 of FIG. 5. However, different configurations are possible.

Figure 6:
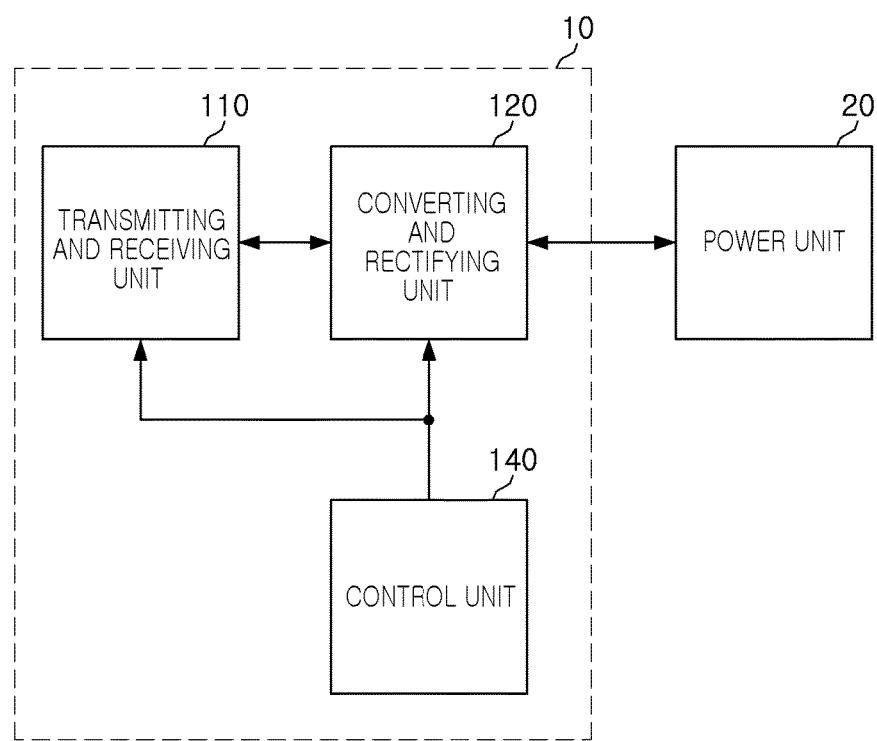
FIG. 6 is a schematic block diagram illustrating an example of an apparatus including a wireless power transmitting and receiving device.

FIG. 6 is a schematic block view illustrating an example of the apparatus 1 including the wireless power transmitting and receiving device 10. The apparatus 1 includes the wireless power transmitting and receiving device 10 and the power unit 20. The wireless power transmitting and receiving device 10 includes a transmitting and receiving unit 110, a converting and rectifying unit 120, and a control unit 140.

The transmitting and receiving unit 110 may include a transmitting and receiving coil that receives power transmitted wirelessly and transmits power wirelessly. In a part of the transmitting and receiving coil, the wirelessly transmitted power may be received via a first section having a first number of turns, and the power may be wirelessly transmitted via a second section having a second number of turns.

The converting and rectifying unit 120 may receive and rectify the power received via the transmitting and receiving unit 110, generate charging power, and output the charging power to the power unit 20. The converting and rectifying unit 120 may receive a supply of the power from the power unit 20, convert the supplied power into alternating current power, and output the alternating current power to the transmitting and receiving unit 110. The alternating current power may be applied to the transmitting and receiving coil of the transmitting and receiving unit 110. The converting and rectifying unit 120 may include a rectifying unit and a converting unit each including separate bridge circuits, and/or may include a single bridge circuit that performs as a rectifying unit that outputs the charging power and as a converting unit that generates the alternating current power.

The control unit 140 may control the transmitting and receiving unit 110 and/or the converting and rectifying unit 120. The control unit 140 may receive information about a voltage that may be provided to a wireless power receiving device from the wireless power receiving device, detect information regarding a magnitude of the charging power, and may detect information about the voltage of some nodes inside the converting and rectifying unit 120 and/or current flowing through some paths in order to control the converting and rectifying unit 120.

The first number of turns and the second number of turns of the transmitting and receiving coil may be different from each other. For example, the second number of turns may be lower than the first number of turns, but is not limited thereto. The converting and rectifying unit 120 may be electrically connected to both ends of the transmitting and receiving coil of the transmitting and receiving unit 110 in a receiving mode in which the wirelessly transmitted power is received. The converting and rectifying unit 120 may be electrically connected to a tab disposed between one end of the transmitting and receiving coil of the transmitting and receiving unit 110 and both ends of the transmitting and receiving coil in a transmitting mode in which the power is transmitted wirelessly.

In a case in which the transmitting and receiving unit 110 transmits power wirelessly, the converting and rectifying unit 120 may amplify the power supplied from the power unit 20 and convert the amplified power into the alternating current power. In this case, the converting and rectifying unit 120 may be electrically connected to both ends of the transmitting and receiving coil 110 in the receiving mode and the transmitting mode. Alternatively, the converting and rectifying unit 120 may be electrically connected to both ends of the transmitting and receiving coil of the transmitting and receiving unit 110 in the transmitting mode, and may be electrically connected to the tab present between the one end of the transmitting and receiving coil of the transmitting and receiving unit 110 and both ends of the transmitting and receiving coil in the receiving mode, but the configuration is not limited thereto. For example, the converting and rectifying unit 120 may be electrically connected to both ends of the transmitting and receiving coil of the transmitting and receiving unit 110 in the receiving mode, and may be electrically connected to the tab present between the one end of the transmitting and receiving coil of the transmitting and receiving unit 110 and both ends of the transmitting and receiving coil in the transmitting mode.

The power unit 20 may include a battery, may receive a supply of the charging power from the converting and rectifying unit 120, may store electrical power, and may supply power to the converting and rectifying unit 120 by using the stored electrical power. The power unit 20 may supply the power not only to the converting and rectifying unit 120 but also to other elements of the apparatus 1.

Figure 7:
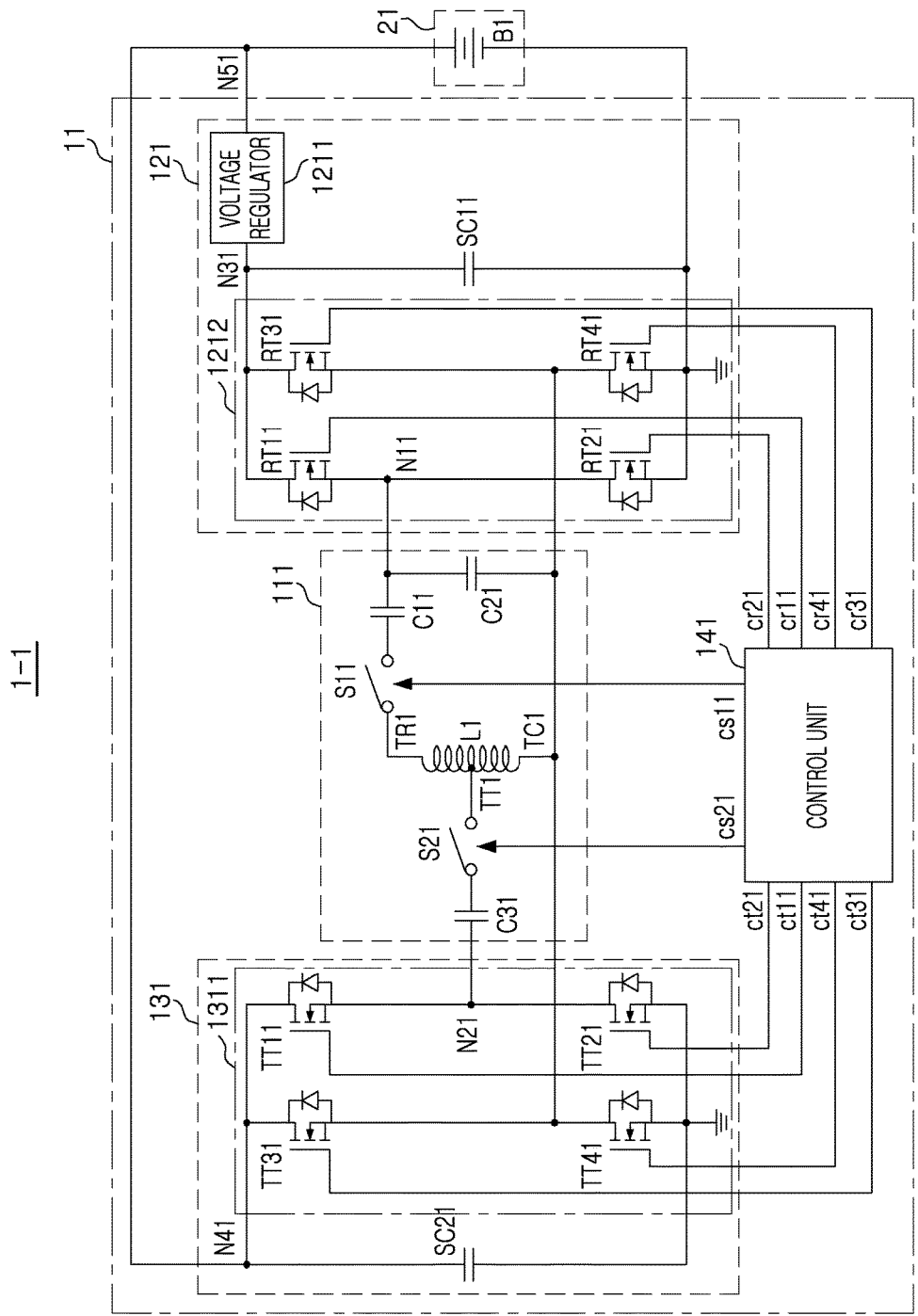
FIG. 7 is a schematic diagram illustrating an example of an apparatus including a wireless power transmitting and receiving device.

FIG. 7 is a schematic diagram of an example of an apparatus 1-1 including a wireless power transmitting and receiving device 11. The apparatus 1-1 includes the wireless power transmitting and receiving device 11 and a power unit 21. The wireless power transmitting and receiving device 11 includes a transmitting and receiving unit 111, a rectifying unit 121, a converting unit 131, and a control unit 141. That is, as shown in FIG. 7, a converting and rectifying unit (120 of FIG. 6) may include the rectifying unit 121 including bridge circuit 1212 and the converting unit 131 including bridge circuit 1311.

The transmitting and receiving unit 111 may receive wirelessly transmitted power and may transmit the power wirelessly. The transmitting and receiving unit 111 includes a transmitting and receiving coil L1, a switch S11, a capacitor C11, a capacitor C21, a switch S21, and a capacitor C31.

The transmitting and receiving coil L1 may include: a common terminal TC1 electrically connected to the rectifying unit 121 and the converting unit 131 in a receiving mode in which the wirelessly transmitted power is received and a transmitting mode in which the power is transmitted wirelessly; a receiving terminal TR1 electrically connected to the rectifying unit 121 in the receiving mode, and a transmitting terminal TT1 electrically connected to the converting unit 131 and disposed between the receiving terminal TR1 and the common terminal TC1 in the transmitting mode. The transmitting terminal TT1 may be a tab disposed between the ends of the transmitting and receiving coil L1. The number of turns between the common terminal TC1 and the receiving terminal TR1 of the transmitting and receiving coil L1 may be, for example, 12-15, but is not limited thereto. The number of turns between the common terminal TC1 and the transmitting terminal TT1 may be 10, but is not limited thereto.

The switch S11 may be connected to the receiving terminal TR1, may be turned on in the receiving mode, and may be turned off in the transmitting mode according to the control of the control unit 141. The capacitor C11 may be connected between the switch S11 and a node N11. The capacitor C21 may be connected between the node N11 and the common terminal TC1 (in the present specification, being "connected" may include all cases of being electrically connected). In the receiving mode, the wirelessly transmitted power may be received through a section of the transmitting and receiving coil L1 between the common terminal TC1 and the receiving terminal TR1, and the section of the transmitting and receiving coil L1 between the common terminal TC1 and the receiving terminal TR1 and the capacitor C11 (or the capacitor C11 and the capacitor C21) may act as a resonance tank. The capacitor C21 may detect a relative location between the wireless power transmitting and receiving device 11 and a wireless power transmitter transmitting. For example, the wireless power transmitter may transmit wireless power having a resonance frequency determined by inductance of the section of the transmitting and receiving coil L1 between the common terminal TC1 and the receiving terminal TR1, capacitance of the capacitor C11, and capacitance of the capacitor C21, may determine whether the wireless power transmitting and receiving device 11 is present and/or may determine a location of the wireless power transmitting and receiving device 11, etc. The wireless power transmitter may transmit the wireless power having the resonance frequency determined by the inductance of the section between the common terminal TC1 and the receiving terminal TR1 of the transmitting and receiving coil L1 and the capacitance of the capacitor C11 according to the determined result.

The switch S21 may be connected to the transmitting terminal TT1, may be turned off in the receiving mode, and may be turned on in the transmitting mode according to the control of the control unit 141. The capacitor C31 may be connected between the switch S21 and a node N21. In the transmitting mode, the power may be wirelessly transmitted through the section of the transmitting and receiving coil L1 between the common terminal TC1 and the transmitting terminal TT1, and the section of the transmitting and receiving coil L1 between the common terminal TC1 and the transmitting terminal TT1 and the capacitor C31 may act as a resonance tank.

The rectifying unit 121 may be connected to the node N11 and the common terminal TC1, may rectify a voltage between the node N11 and the common terminal TC1 in the receiving mode, and may output a charging voltage according to the control of the control unit 141. The rectifying unit 121 includes bridge circuit 1212, a smoothing capacitor SC11, and a voltage regulator 1211.

The bridge circuit 1212 may rectify the voltage between the node N11 and the common terminal TC1 and may output the rectified voltage to a node N31 according to the control of the control unit 141. The bridge circuit 1212 includes a transistor RT11 connected between the node N11 and the node N31, a transistor RT21 connected between the node N11 and a ground, a transistor RT31 connected between the node N31 and the common terminal TC1, and a transistor RT41 connected between the common terminal TC1 and the ground. Each of the transistors RT11, RT21, RT31, and RT41 included in the bridge circuit 1212 may be a field effect transistor including a parasitic diode, but is not limited thereto.

The smoothing capacitor SC11 may be connected between the node N31 and the ground, and may smooth a voltage of the node N31, i.e., the rectified voltage.

The voltage regulator 1211 may receive the voltage of the node N31, i.e., the rectified voltage, and output a charging voltage having a consistent value irrespective of variations in a level of the rectified voltage or variations in a level of a load. A low drop out (LDO) regulator, etc. may be included in the voltage regulator 1211.

The converting unit 131 may be connected to a node N21 and the common terminal TC1, and may apply alternating current voltage to the node N21 and both ends of the common terminal TC1 in the transmitting mode according to the control of the control unit 141. The converting unit 131 includes bridge circuit 1311 and a smoothing capacitor SC21.

The bridge circuit 1311 may generate an alternating current voltage using the power supplied from the power unit 21 according to the control of the control unit 141. That is, the bridge circuit 1311 may operate as a full bridge inverter. The bridge circuit 1311 may include a transistor TT11 connected between a node N41 and the node N21, a transistor TT21 connected between the node N21 and the ground, a transistor TT31 connected between the node N41 and the common terminal TC1, and a transistor TT41 connected between the common terminal TC1 and the ground. Each of the transistors TT11, TT21, TT31, and TT41 included in the bridge circuit 1311 may be a field effect transistor including a parasitic diode, but is not limited thereto.

The smoothing capacitor SC21 may smooth a voltage of the power supplied from the power unit 21, i.e. a voltage of the node N41.

The control unit 141 may output control signals cs11, cs21, cr11, cr21, cr31, cr41, ct11, ct21, ct31, and ct41 that respectively control the switches S11 and S21 and the transistors RT11, RT21, RT31, RT41, TT11, TT21, TT31, and TT41. The control unit 141 may receive voltage of both ends of at least one of the transistors RT11, RT21, RT31, and RT41 in order to control the transistors RT11, RT21, RT31, and RT41. The control unit 141 may also receive information regarding a voltage received by a wireless power receiving device receiving the power transmitted by the wireless power transmitting and receiving device 11 or a voltage that may be provided to the wireless power receiving device from the wireless power receiving device in order to control the transistors TT11, TT21, TT31, and TT41.

The power unit 21 may receive the charging voltage in the receiving mode, store electrical power, and supply power to the converting unit 131 in the transmitting mode. The power unit 21 may include a battery B1 and may supply the power to other elements of the apparatus 1-1.

Figure 8:
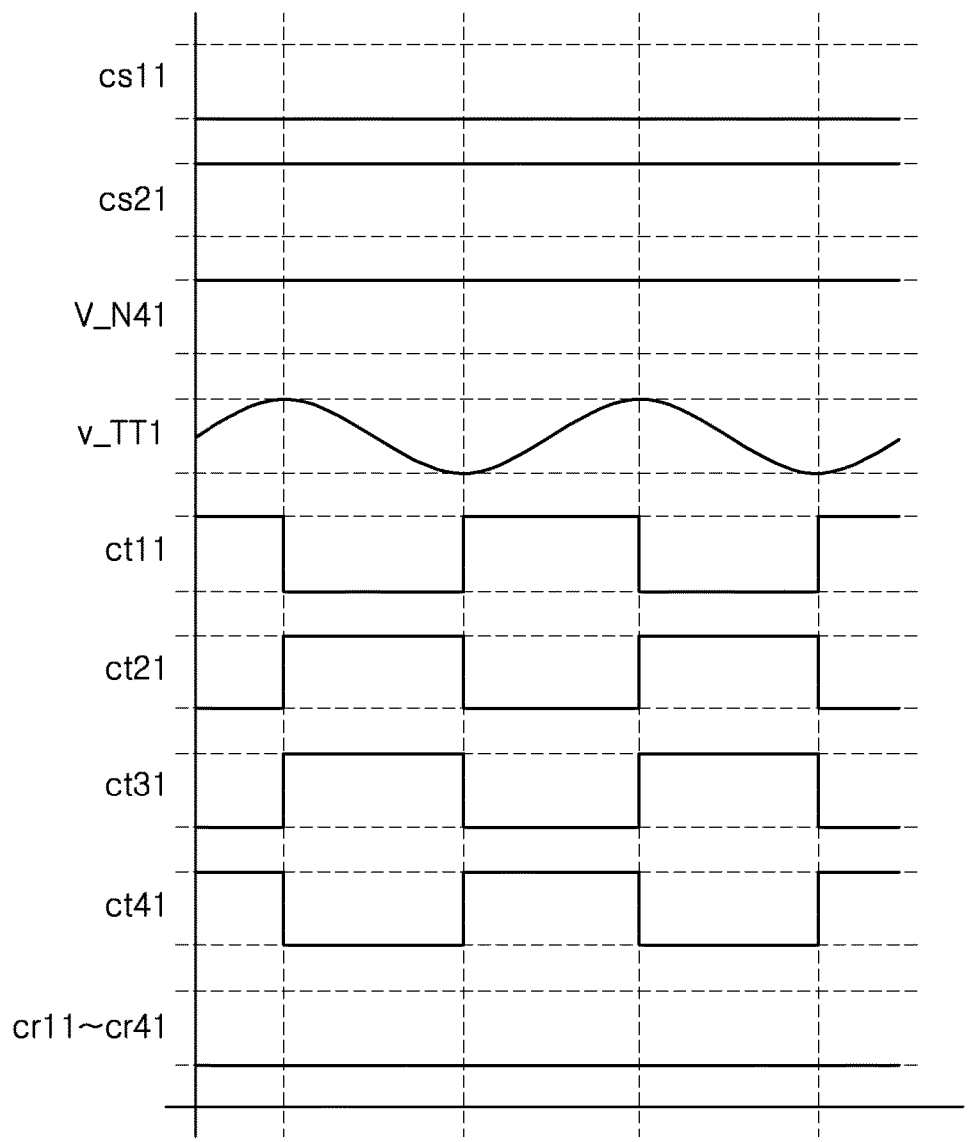
FIG. 8 is a timing diagram illustrating an example of an operation of a wireless power transmitting and receiving device of FIG. 7 in a transmitting mode.

FIG. 8 is a timing diagram illustrating an example of an operation of the wireless power transmitting and receiving device 11 of FIG. 7 in a transmitting mode. In FIG. 8, cs11 denotes a switch control signal applied to the switch S11, cs21 denotes a switch control signal applied to the switch S21, ct11 denotes a control signal applied to the transistor TT11, ct21 denotes a control signal applied to the transistor TT21, ct31 denotes a control signal applied to the transistor TT31, ct41 denotes a control signal applied to the transistor TT41, V_N41 denotes a voltage of the node N41, v_TT1 denotes a voltage between the transmitting terminal TT1 and the common terminal TC1 of the transmitting and receiving coil L1, and cr11-cr41 denote control signals respectively applied to the transistors RT11-RT41.

The operation of the wireless power transmitting and receiving device 11 in the transmitting mode will now be described with reference to FIGS. 7 and 8.

In the transmitting mode in which the wireless power transmitting and receiving device 11 transmits power wirelessly, the voltage V_N41 of the node N41 may be the same as an output voltage of the battery B1 of the power unit 21. Additionally or alternatively, the voltage V_N41 of the node N41 may be the same as a voltage of charging power that is output by a wireless power receiving device receiving the power transmitted from the wireless power transmitting and receiving device 11.

To operate the wireless power transmitting and receiving device 11 in the transmitting mode, the control unit 141 may output the switch control signal cs11 at a relatively low level and the switch control signal cs21 at a relatively high level. Thus, the switch S11 may be turned off, and the switch S21 may be turned on. That is, the transmitting and receiving coil L1 may be electrically connected to the converting unit 131. In this configuration, the transmitting terminal TT1 and the common terminal TC1 of the transmitting and receiving coil L1 may be electrically connected to the converting unit 131.

The control unit 141 may output the control signals ct11, ct21, ct31, and ct41 for controlling the bridge circuit 1311 of the converting unit 131. The control signals ct11, ct21, ct31, and ct41 may be a square wave having a duty ratio of 50%. The control signals ct11 and ct41 and the control signals ct21 and ct31 may have opposite phases. Thus, the transistors TT11, TT21, TT31, and TT41 may be periodically turned on and off while the transistors TT11 and TT41 and the transistors TT21 and TT31 may be complementarily turned on and off. As shown in FIG. 8, on and off periods of the transistors TT11, TT21, TT31, and TT41 may be determined by frequencies of the control signals ct11, ct21, ct31, and ct41. That is, the bridge circuit 1311 of the converting unit 131 may operate as a full bridge inverter.

According to operation of the bridge circuit 1311, alternating current voltage may be applied between the node N21 and the common terminal TC1 of the transmitting and receiving coil L1, and thus the alternating current voltage may also be applied between the transmitting terminal TT1 and the common terminal TC1 of the transmitting and receiving coil L1. The power may be transmitted wirelessly through a section of the transmitting and receiving coil L1 between the transmitting terminal TT1 and the common terminal TC1.

An amplitude of the voltage v_TT1 between the transmitting terminal TT1 and the common terminal TC1 of the transmitting and receiving coil L1 may be determined by the frequencies of the control signals ct11, ct21, ct31, and ct41. The control unit 141 may determine the frequencies of the control signals ct11, ct21, ct31, and ct41 based on the information received from the wireless power receiving device. For example, when the wireless power receiving device receives low power, the wireless power receiving device may transmit information regarding low power characteristics to the wireless power transmitting and receiving device 11. The control unit 141 may reduce the frequencies of the control signals ct11, ct21, ct31, and ct41 in response to the information such that the amplitude of the voltage v_TT1 between the transmitting terminal TT1 and the common terminal TC1 may be increased. On the contrary, in a case in which the wireless power receiving device receives high power, the wireless power receiving device may transmit information regarding high power characteristics to the wireless power transmitting and receiving device 11, and the control unit 141 may increase the frequencies of the control signals ct11, ct21, ct31, and ct41 in response to the information in such a manner that the amplitude of the voltage v_TT1 between the transmitting terminal TT1 and the common terminal TC1 may be reduced.

The control unit 141 may output all of the control signals ct11, ct21, ct31, and ct41 of a low level in such a manner that the bridge circuit 1212 of the rectifying unit 121 may not operate in the transmitting mode.

Figure 9:
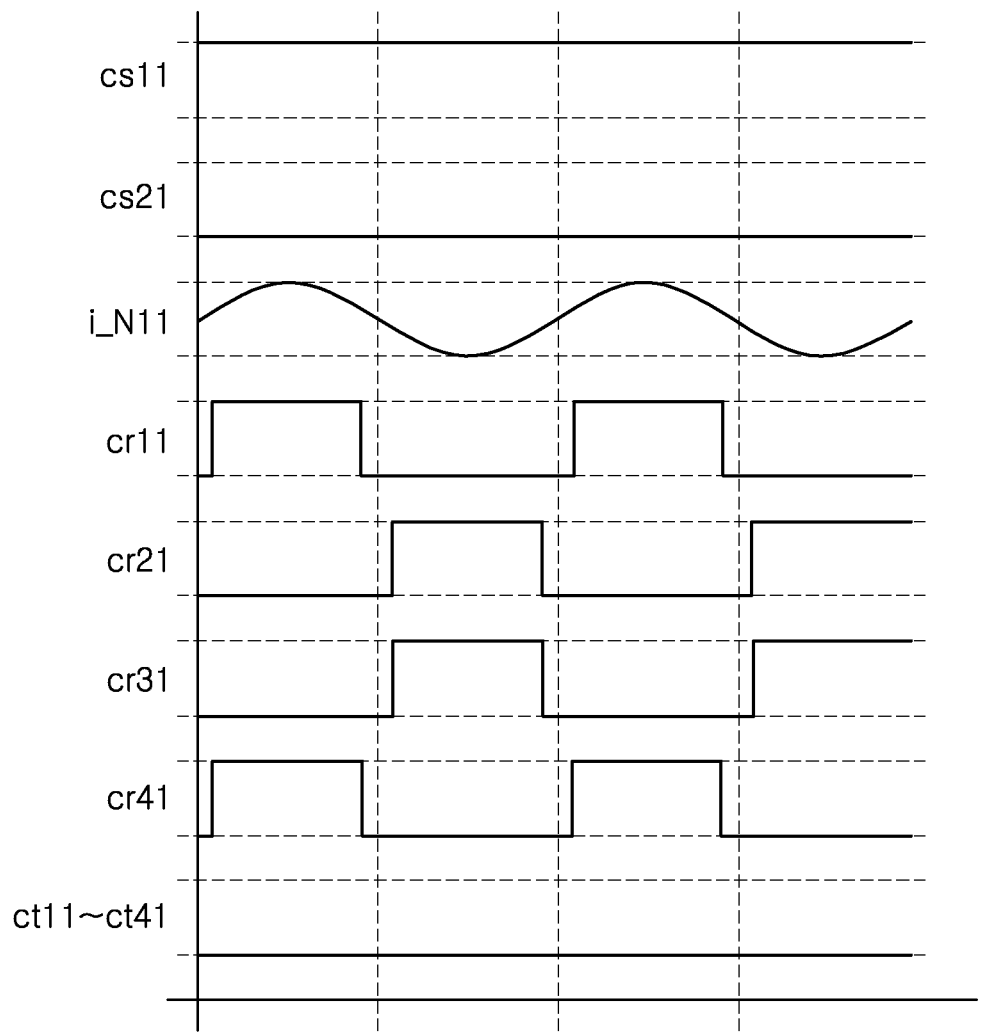
FIG. 9 is a timing diagram illustrating an example of an operation of a wireless power transmitting and receiving device of FIG. 7 in a receiving mode.

FIG. 9 is a timing diagram illustrating an example of an operation of the wireless power transmitting and receiving device 11 of FIG. 7 in a receiving mode. In FIG. 9, cs11 denotes a switch control signal applied to the switch S11, cs21 denotes a switch control signal applied to the switch S21, cr11 denotes a control signal applied to the transistor RT11, cr21 denotes a control signal applied to the transistor RT21, cr31 denotes a control signal applied to the transistor RT31, cr41 denotes a control signal applied to the transistor RT41, and i_N11 denotes a current flowing from the transmitting and receiving unit 111 to the rectifying unit 121 through the node N11.

The operation of the wireless power transmitting and receiving device 11 in the receiving mode will now be described with reference to FIGS. 7 and 9.

To operate the wireless power transmitting and receiving device 11 in a transmitting mode in which power is transmitted wirelessly, the control unit 141 may output the switch control signal cs11 at a relatively high level and the switch control signal cs21 at a relatively low level. Thus, the switch S11 may be turned on, and the switch S21 may be turned off. That is, the transmitting and receiving coil L1 may be electrically connected to the rectifying unit 121. In this configuration, the receiving terminal RT1 and the common terminal TC1 of the transmitting and receiving coil L1 may be electrically connected to the rectifying unit 121.

If the transmitting and receiving unit 111 of the wireless power transmitting and receiving device 11 receives the wirelessly transmitted power, the current i_N11 of FIG. 9 may flow from the transmitting and receiving unit 111 to the rectifying unit 121 via the node N11.

The control unit 141 may output the control signals cr11, cr21, cr31, and cr41 for controlling the bridge circuit 1212 of the rectifying unit 121. To this end, the control unit 141 may receive voltage of both ends of at least one of the transistors RT11, RT21, RT31, and RT41 of the bridge circuit 1212. For example, the control unit 141 may output the control signals cr11 and cr41 in response to the voltage of both ends of the transistor RT11 and the control signals cr21 and cr31 in response to the voltage of both ends of the transistor RT21. For example, if the voltage of both ends of the transistor RT11 is less than a first reference value, the control unit 141 may change a state of the control signals cr11 and cr41 from the low level to the high level, and, if the voltage of both ends of the transistor RT11 is greater than than a second reference value, the control unit 141 may change the state of the control signals cr11 and cr41 from the high level to the low level. If the voltage of both ends of the transistor RT21 is less than a third reference value, the control unit 141 may change a state of the control signals cr21 and cr31 from the low level to the high level, and, if the voltage of both ends of the transistor RT21 is greater than than a fourth reference value, the control unit 141 may change the state of the control signals cr21 and cr31 from the high level to the low level.

Operations of the bridge circuit 1212 will be described in more detail below.

In a case in which the current i_N11 has a negative value or has a positive value less than a predetermined value, since a parasitic diode of the transistor RT11 is in an off state, the voltage of both ends of the transistor RT11 is high. Thereafter, if the current i_N11 has a positive value and thus has an absolute value greater than a predetermined value, the parasitic diode of the transistor RT11 is turned on, and thus the voltage of both ends of the transistor RT11 is reduced to a level less than the first reference value (for example, the voltage of both ends of the transistor RT11 may be 0.7 V). At this time, the control unit 141 may change the state of the control signals cr11 and cr41 from the low level to the high level. Therefore, the transistors RT11 and RT41 may be turned on. Thereafter, if the current i_N11 has the positive value and thus has the absolute value less than the predetermined value, the amount of current flowing through the transistor RT11 is reduced, and thus the voltage of both ends of the transistor RT11 has the absolute value below the predetermined value. At this time, the control unit 141 may change the state of the control signals cr11 and cr41 from the high level to the low level. Therefore, the transistors RT11 and RT41 may be turned off.

In a case in which the current i_N11 has a positive value or has a negative value greater than a predetermined value, since a parasitic diode of the transistor RT21 is in an off state, the voltage of both ends of the transistor RT21 is high. Thereafter, if the current i_N11 has the negative value and thus has an absolute value greater than a predetermined value, the parasitic diode of the transistor RT21 is turned on, and thus the voltage of both ends of the transistor RT21 is less than the first reference value (for example, the voltage of both ends of the transistor RT21 may be 0.7 V). At this time, the control unit 141 may change the state of the control signals cr21 and cr31 from the low level to the high level. Therefore, the transistors RT21 and RT31 may be turned on. Thereafter, if the current i_N11 has the negative value and thus has the absolute value less than the predetermined value, an amount of current flowing through the transistor RT21 is reduced, and thus the voltage of both ends of the transistor RT21 has the absolute value less than the predetermined value. At this time, the control unit 141 may change the state of the control signals cr21 and cr31 from the high level to the low level. Therefore, the transistors RT21 and RT31 may be turned off.

The control unit 141 may output all the control signals ct11, ct21, ct31, and ct41 of a low level in such a manner that the bridge circuit 1311 of the converting unit 131 may not operate in the receiving mode.

In the receiving mode, a rectified voltage may be output to the node N31 by the operations of the bridge circuit 1212, and the voltage regulator 1211 may receive the rectified voltage and output a charging voltage having a uniform magnitude to a node N51. The charging voltage may be applied to the battery B1 of the power unit 21 so that the battery B1 may be charged with the charging voltage.

Figure 10:
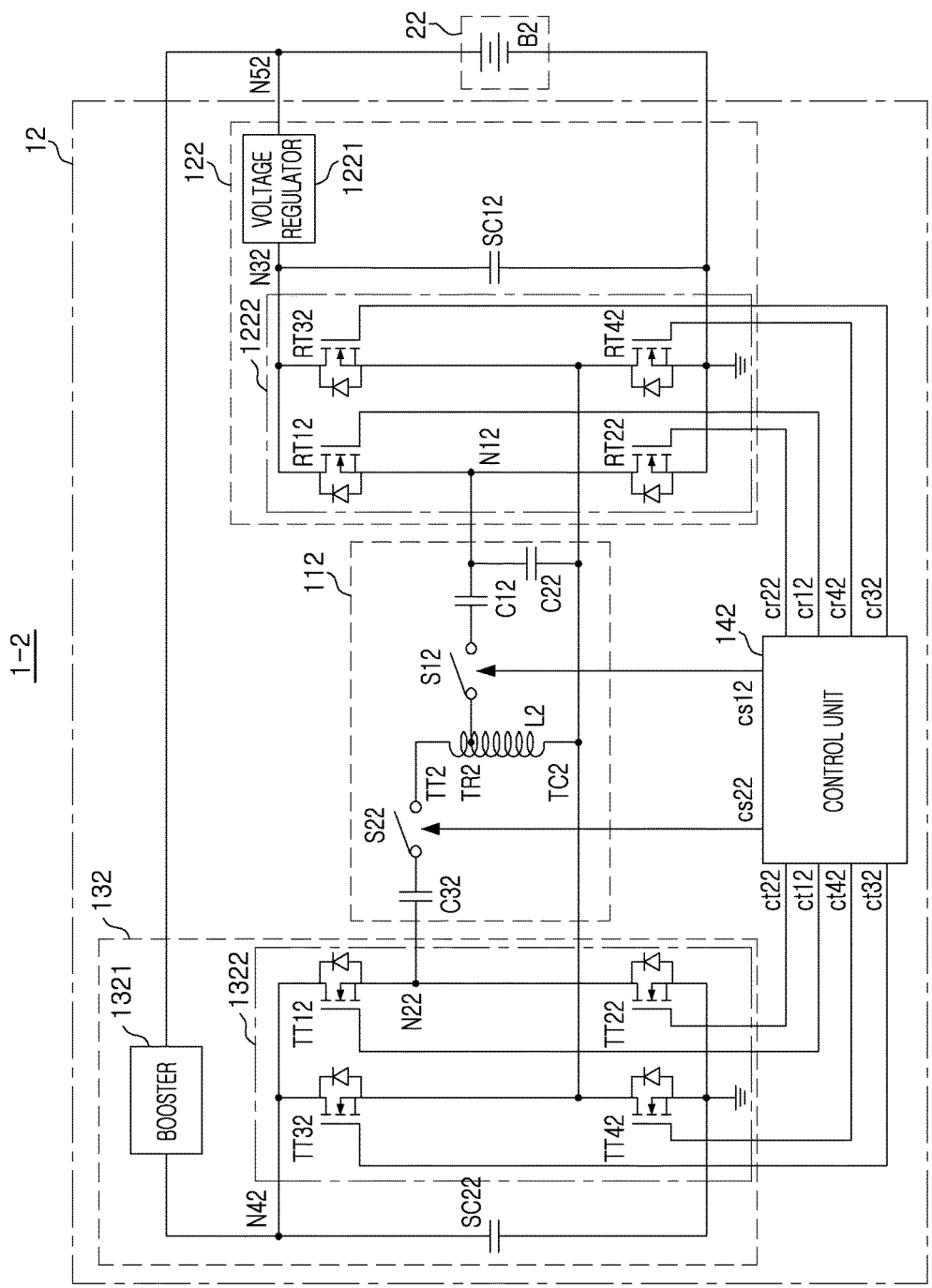
FIG. 10 is a schematic diagram illustrating an example of an apparatus including a wireless power transmitting and receiving device.

FIG. 10 is a schematic diagram of an example of an apparatus 1-2 including a wireless power transmitting and receiving device 12. The apparatus 1-2 may include the wireless power transmitting and receiving device 12 and a power unit 22. The wireless power transmitting and receiving device 12 includes a transmitting and receiving unit 112, a rectifying unit 122, a converting unit 132, and a control unit 142. That is, as shown in FIG. 10, a converting and rectifying unit (120 of FIG. 6) may include the rectifying unit 122 including bridge circuit 1222 and the converting unit 132 including bridge circuit 1322.

The transmitting and receiving unit 112 may receive wirelessly transmitted power and may transmit the power wirelessly. The transmitting and receiving unit 112 includes a transmitting and receiving coil L2, a switch S12, a capacitor C12, a capacitor C22, a switch S22, and a capacitor C32.

The transmitting and receiving coil L2 may include: a common terminal TC2 electrically connected to the rectifying unit 122 and the converting unit 132 in a receiving mode in which the wirelessly transmitted power is received and a transmitting mode in which the power is transmitted wirelessly; a receiving terminal TR2 electrically connected to the rectifying unit 122 and disposed between a transmitting terminal TT2 and the common terminal TC2 in the receiving mode; and the transmitting terminal TT2 electrically connected to the converting unit 132 in the transmitting mode. The receiving terminal TR2 may be a tab disposed between the ends of the transmitting and receiving coil L2. The number of turns between the common terminal TC2 and the receiving terminal TR2 of the transmitting and receiving coil L2 may be, for example, 12-15, but is not limited thereto. The number of turns between the common terminal TC2 and the transmitting terminal TT2 may be greater than 15, but is not limited thereto.

The switch S12 may be connected to the receiving terminal TR2, may be turned on in the receiving mode, and may be turned off in the transmitting mode according to the control of the control unit 142. The capacitor C12 may be connected between the switch S12 and a node N12. The capacitor C22 may be connected between the node N12 and the common terminal TC2. In the receiving mode, the wirelessly transmitted power may be received through a section of the transmitting and receiving coil L2 between the common terminal TC2 and the receiving terminal TR2, and the section of the transmitting and receiving coil L2 between the common terminal TC2 and the receiving terminal TR2 and the capacitor C12 (or the capacitor C12 and the capacitor C22) may act as a resonance tank. Operation and characteristics of the capacitor C22 may be similar as those of the capacitor C21 of FIG. 7.

The switch S22 may be connected to the transmitting terminal TT2, may be turned off in the receiving mode, and may be turned on in the transmitting mode according to the control of the control unit 142. The capacitor C32 may be connected between the switch S22 and a node N22. In the transmitting mode, the power may be wirelessly transmitted through the section of the transmitting and receiving coil L2 between the common terminal TC2 and the transmitting terminal TT2, and the section between the common terminal TC2 and the transmitting terminal TT2 of the transmitting and receiving coil L2 and the capacitor C32 may act as a resonance tank.

The rectifying unit 122 may be connected to the node N12 and the common terminal TC2, may rectify a voltage between the node N12 and the common terminal TC2 in the receiving mode, and may output a charging voltage according to the control of the control unit 142. The rectifying unit 122 includes bridge circuit 1222, a smoothing capacitor SC12, and a voltage regulator 1221.

The bridge circuit 1222 may rectify the voltage between the node N12 and the common terminal TC2 and output the rectified voltage to a node N32 according to the control of the control unit 142. The bridge circuit 1222 includes a transistor RT12 connected between the node N12 and the node N32, a transistor RT22 connected between the node N12 and a ground, a transistor RT32 connected between the node N32 and the common terminal TC2, and a transistor RT42 connected between the common terminal TC2 and the ground. Each of the transistors RT12, RT22, RT32, and RT42 included in the bridge circuit 1222 may be a field effect transistor including a parasitic diode, but is not limited thereto.

The smoothing capacitor SC12 may be connected between the node N32 and the ground, and may smooth a voltage of the node N32, i.e., the rectified voltage.

The voltage regulator 1221 may receive the voltage of the node N32, i.e., the rectified voltage, and output a charging voltage having a consistent value irrespective of a variation of the rectified voltage or a variation of a load. A low drop out (LDO) regulator, etc. may be used as the voltage regulator 1221.

The converting unit 132 may be connected to a node N22 and the common terminal TC2, may boost a voltage of the power supplied from the power unit 22 in the transmitting mode according to the control of the control unit 142, and may apply alternating current voltage to the node N22 and both ends of the common terminal TC2 by using the boosted voltage. The converting unit 132 includes a booster 1321, bridge circuit 1322, and a smoothing capacitor SC22.

The booster 1321 may boost and output the voltage of the power supplied from the power unit 22. In more detail, the booster 1321 may boost a voltage of a node N52 and output the voltage to a node N42.

The bridge circuit 1322 may generate an alternating current voltage using the voltage output by the booster 1321, i.e., the voltage of the node N42, according to the control of the control unit 142. That is, the bridge circuit 1322 may operate as a full bridge inverter. The bridge circuit 1322 may include a transistor TT12 connected between the node N42 and the node N22, a transistor TT22 connected between the node N22 and the ground, a transistor TT32 connected between the node N42 and the common terminal TC2, and a transistor TT42 connected between the common terminal TC2 and the ground. Each of the transistors TT12, TT22, TT32, and TT42 included in the bridge circuit 1322 may be a field effect transistor including a parasitic diode, but is not limited thereto.

The smoothing capacitor SC22 may smooth the voltage output by the booster 1321, i.e., the voltage of the node N42.

Operations and characteristics of each of the control unit 142 and the power unit 22 may be similar to those described with regards to the control unit 141 and the power unit 21, respectively, of FIG. 7.

Figure 11:
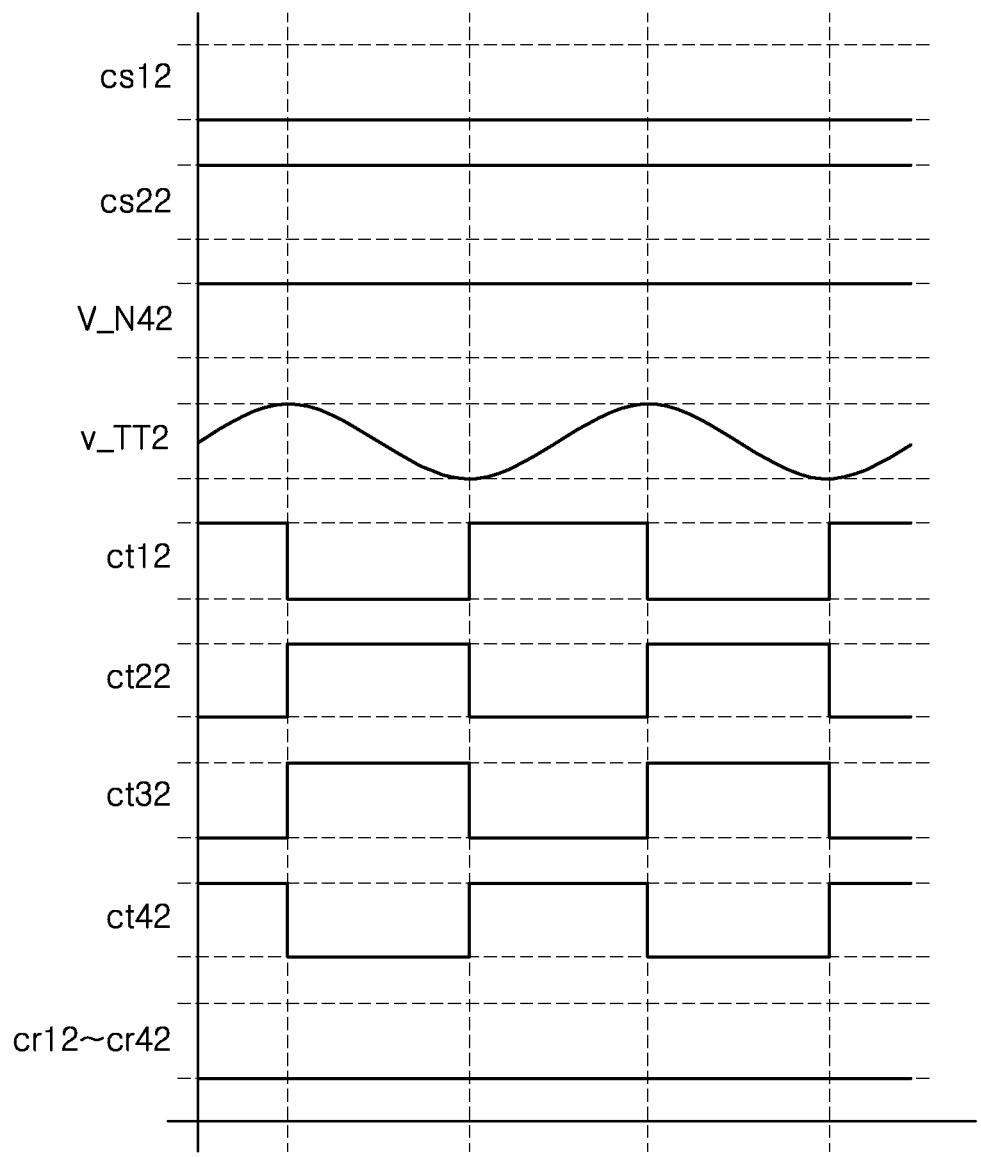
FIG. 11 is a timing diagram illustrating an operation of a wireless power transmitting and receiving device of FIG. 10 in a transmitting mode.

FIG. 11 is a timing diagram illustrating an example of an operation of the wireless power transmitting and receiving device 12 of FIG. 10 in a transmitting mode. In FIG. 11, cs12 denotes a switch control signal applied to the switch S12, cs22 denotes a switch control signal applied to the switch S22, ct12 denotes a control signal applied to the transistor TT12, ct22 denotes a control signal applied to the transistor TT22, ct32 denotes a control signal applied to the transistor TT32, ct42 denotes a control signal applied to the transistor TT42, V_N42 denotes a voltage of the node N42, v_TT2 denotes a voltage between the transmitting terminal TT2 and the common terminal TC2 of the transmitting and receiving coil L2, and cr12-cr42 denote control signals respectively applied to the transistors RT12-RT42.

The operation of the wireless power transmitting and receiving device 12 in the transmitting mode will now be described with reference to FIGS. 10 and 11.

The booster 1321 may boost a voltage of power supplied from the power unit 22 (i.e., a voltage of the node N52) and output the boosted voltage to the node N42. For example, if a wireless power receiving device receiving power transmitted from the wireless power transmitting and receiving device 12 outputs charging power having a voltage of 5 V, the booster 1321 may boost and output the voltage of the node N52 so that the voltage of the node N42 may be greater than about 10 V. However, this is merely an example, and a voltage supplied from the power unit 22 may be boosted to various values by the booster 1321.

Operation and characteristics of the control unit 142 and the bridge circuit 1322 and a process of transmitting power through a section between the transmitting terminal TT2 and the common terminal TC2 of the transmitting and receiving coil L2 of the transmitting and receiving unit 112 in the transmitting mode may be similar to those described above with reference to FIG. 8.

The control unit 142 may maintain frequencies of the control signals ct12, ct22, ct32, and ct42 while regulating the voltage v_TT2 between the transmitting terminal TT2 and the common terminal TC2 of the transmitting and receiving coil L2 of the transmitting and receiving unit 112 by regulating a boosting ratio of the booster 1321.

Alternatively, the control unit 142 may regulate the voltage v_TT2 between the transmitting terminal TT2 and the common terminal TC2 of the transmitting and receiving coil L2 of the transmitting and receiving unit 112 by controlling both the boosting ratio of the booster 1321 and the frequencies of the control signals ct12, ct22, ct32, and ct42.

Figure 12:
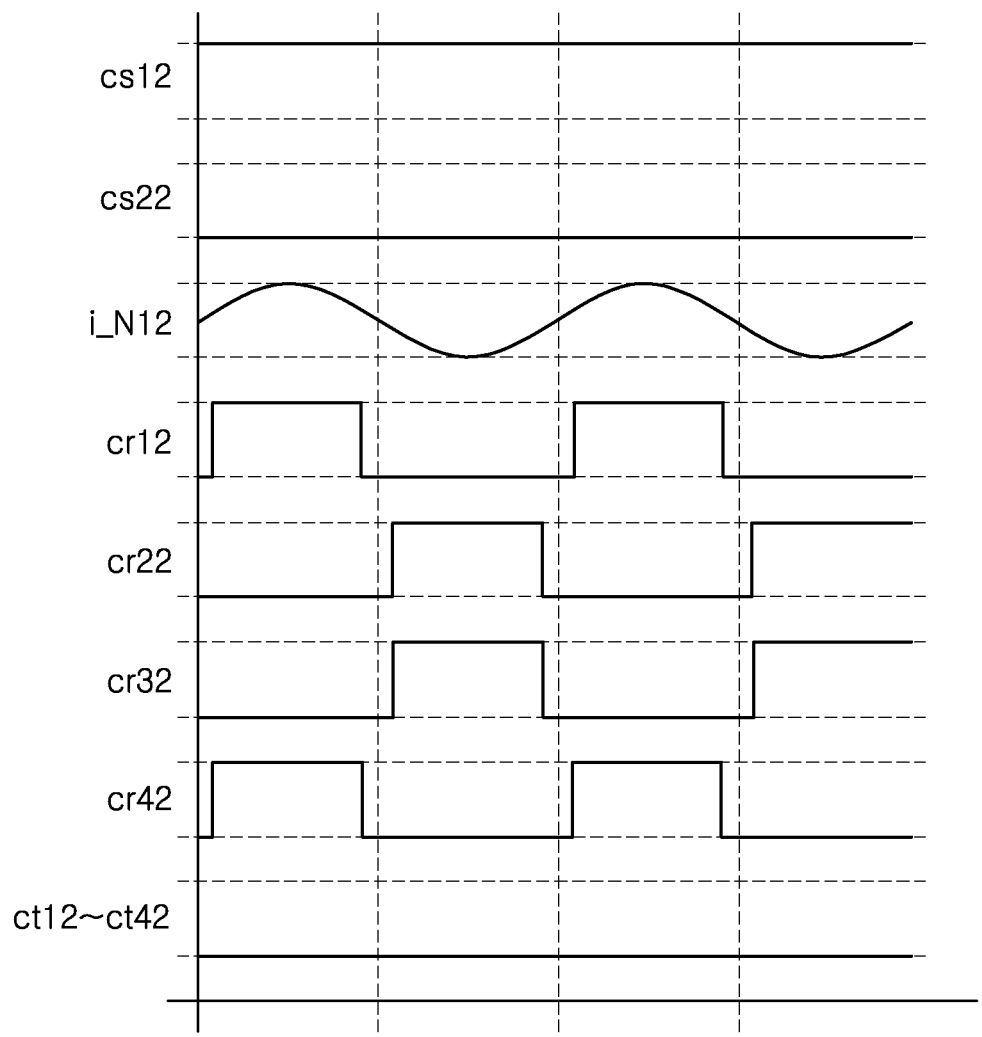
FIG. 12 is a timing diagram illustrating an operation of a wireless power transmitting and receiving device of FIG. 10 in a receiving mode.

FIG. 12 is a timing diagram illustrating an example of an operation of the wireless power transmitting and receiving device 12 of FIG. 10 in a receiving mode. In FIG. 12, cs12 denotes a switch control signal applied to the switch S12, cs22 denotes a switch control signal applied to the switch S22, cr12 denotes a control signal applied to the transistor RT12, cr22 denotes a control signal applied to the transistor RT22, cr32 denotes a control signal applied to the transistor RT32, cr42 denotes a control signal applied to the transistor RT42, and i_N12 denotes a current flowing from the transmitting and receiving unit 112 to the rectifying unit 122 through the node N12.

The operation and characteristics of the wireless power transmitting and receiving device 12 in the receiving mode may be similar to those described above with reference to FIGS. 9, 10, and 12.

Figure 13:
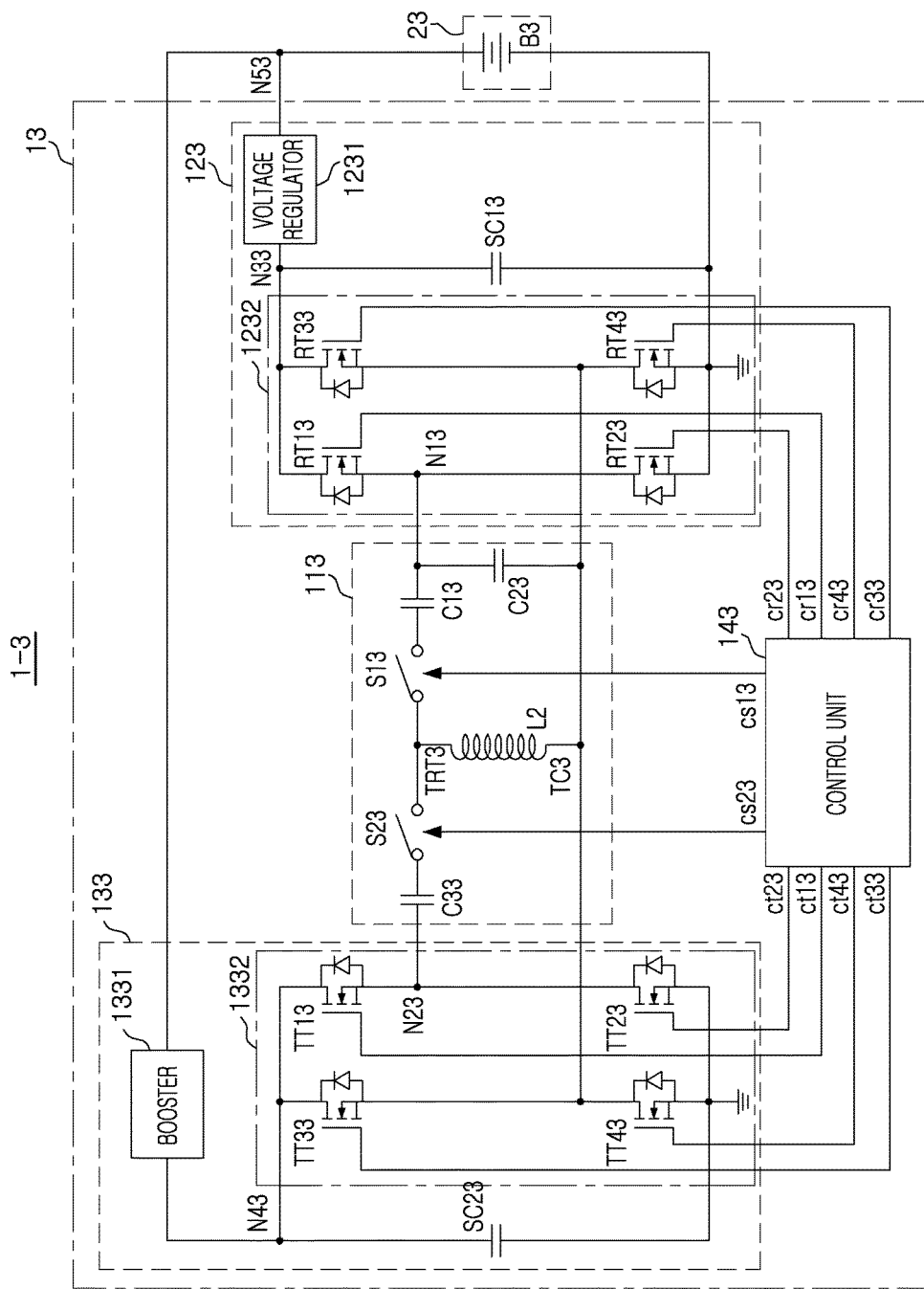
FIG. 13 is a schematic diagram illustrating an example of an apparatus including a wireless power transmitting and receiving device.

FIG. 13 is a schematic diagram illustrating an example of an apparatus 1-3 including a wireless power transmitting and receiving device 13. The apparatus 1-3 includes the wireless power transmitting and receiving device 13 and a power unit 23. The wireless power transmitting and receiving device 13 includes a transmitting and receiving unit 113, a rectifying unit 123, a converting unit 133, and a control unit 143. That is, in FIG. 13, a converting and rectifying unit (120 of FIG. 6) includes the rectifying unit 123 including bridge circuit 1232 and the converting unit 133 including bridge circuit 1332.

The transmitting and receiving unit 113 may receive wirelessly transmitted power and may transmit the power wirelessly. The transmitting and receiving unit 113 includes a transmitting and receiving coil L3, a switch S13, a capacitor C13, a capacitor C23, a switch S23, and a capacitor C33.

The transmitting and receiving coil L3 may include: a common terminal TC3 electrically connected to the rectifying unit 123 and the converting unit 133 in a receiving mode in which the wirelessly transmitted power is received and a transmitting mode in which power is transmitted wirelessly; and a transmitting and receiving terminal TRT3 electrically connected to the rectifying unit 123 in the receiving mode and electrically connected to the converting unit 133 in the transmitting mode.

The switch S13 may be connected to the transmitting and receiving terminal TRT3, may be turned on in the receiving mode, and may be turned off in the transmitting mode according to the control of the control unit 143. The capacitor C13 may be connected between the switch S13 and a node N13. The capacitor C23 may be connected between the node N13 and the common terminal TC3. In the receiving mode, a section of the transmitting and receiving coil L3 between the common terminal TC3 and the transmitting and receiving terminal TRT3 and the capacitor C13 (or the capacitor C13 and the capacitor C23) may form a resonance tank. Operation and characteristics of the capacitor C23 may be similar to those described above with reference to the capacitor C21 of FIG. 7.

The switch S23 may be connected to the transmitting and receiving terminal TRT3, may be turned off in the receiving mode, and may be turned on in the transmitting mode according to the control of the control unit 143. The capacitor C33 may be connected between the switch S23 and a node N23. In the transmitting mode, the section of the transmitting and receiving coil L3 between the common terminal TC3 and the transmitting and receiving terminal TRT3 and the capacitor C33 may form a resonance tank.

The rectifying unit 123 may be connected to the node N13 and the common terminal TC3, may rectify a voltage between the node N13 and the common terminal TC3 in the receiving mode, and may output a charging voltage according to the control of the control unit 143. The rectifying unit 123 includes bridge circuit 1232, a smoothing capacitor SC13, and a voltage regulator 1231.

The bridge circuit 1232 may rectify the voltage between the node N13 and the common terminal TC3 and may output the rectified voltage to a node N33 according to the control of the control unit 143. The bridge circuit 1232 includes a transistor RT13 connected between the node N13 and the node N33, a transistor RT23 connected between the node N13 and a ground, a transistor RT33 connected between the node N33 and the common terminal TC3, and a transistor RT43 connected between the common terminal TC3 and the ground. Each of the transistors RT13, RT23, RT33, and RT43 included in the bridge circuit 1232 may be a field effect transistor including a parasitic diode, but is not limited thereto.

The smoothing capacitor SC13 may be connected between the node N33 and the ground, and may smooth a voltage of the node N33, i.e., the rectified voltage.

The voltage regulator 1231 may receive the voltage of the node N33, i.e., the rectified voltage, and output a charging voltage having a consistent value irrespective of a variation of the rectified voltage or a variation of a load. A low drop out (LDO) regulator, etc. may be included in the voltage regulator 1231.

The converting unit 133 may be connected to a node N23 and the common terminal TC3, may boost a voltage of the power supplied from the power unit 23 in the transmitting mode according to the control of the control unit 143, and may apply alternating current voltage to the node N23 and both ends of the common terminal TC3 by using the boosted voltage. The converting unit 133 includes a booster 1331, bridge circuit 1332, and a smoothing capacitor SC23.

The booster 1331 may boost and output the voltage of the power supplied from the power unit 23. That is, the booster 1331 may boost a voltage from a node N53 and output the voltage to a node N43.

The bridge circuit 1332 may generate an alternating current voltage using the voltage output by the booster 1331, i.e., the voltage of the node N43, according to the control of the control unit 143. That is, the bridge circuit 1332 may operate as a full bridge inverter. The bridge circuit 1332 may include a transistor TT13 connected between the node N43 and the node N23, a transistor TT23 connected between the node N23 and the ground, a transistor TT33 connected between the node N43 and the common terminal TC3, and a transistor TT43 connected between the common terminal TC3 and the ground. Each of the transistors TT13, TT23, TT33, and TT43 included in the bridge circuit 1332 may be a field effect transistor including a parasitic diode, but is not limited thereto.

The smoothing capacitor SC23 may smooth the voltage output by the booster 1331, i.e., the voltage of the node N43.

Operation and characteristics of the control unit 143 and the power unit 23 may be similar to those described above with reference to the control unit 141 and the power unit 21, respectively, of FIG. 7.

Figure 14:
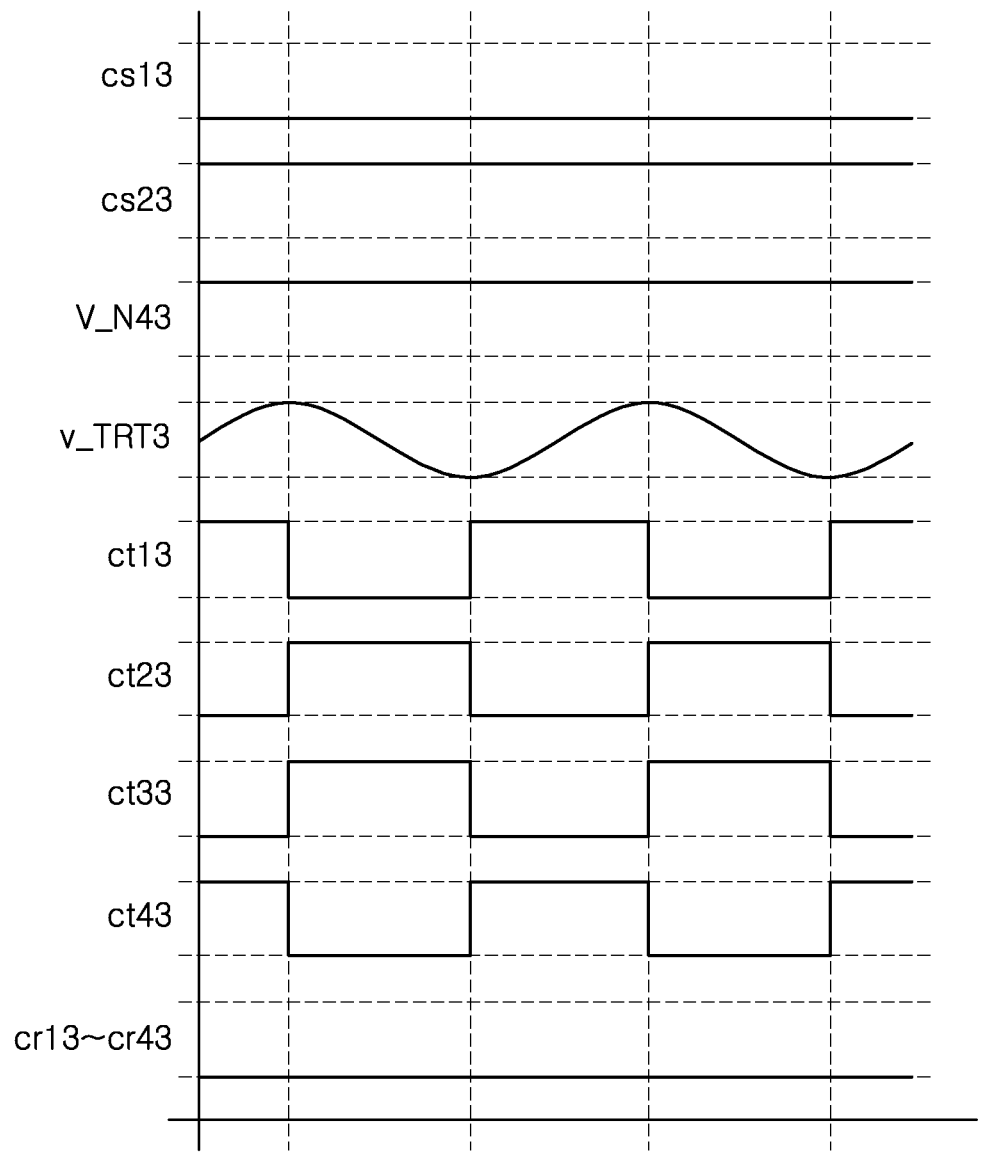
FIG. 14 is a timing diagram illustrating an example of an operation of a wireless power transmitting and receiving device of FIG. 13 in a transmitting mode.

FIG. 14 is a timing diagram illustrating an example of the wireless power transmitting and receiving device 13 of FIG. 13 in a transmitting mode. In FIG. 14, cs13 denotes a switch control signal applied to the switch S13, cs23 denotes a switch control signal applied to the switch S23, ct13 denotes a control signal applied to the transistor TT13, ct23 denotes a control signal applied to the transistor TT23, ct33 denotes a control signal applied to the transistor TT33, ct43 denotes a control signal applied to the transistor TT43, V_N43 denotes a voltage of the node N43, v_TRT3 denotes a voltage between the transmitting and receiving terminal TRT3 and the common terminal TC3 of the transmitting and receiving coil L3, and cr13-cr43 denote control signals respectively applied to the transistors RT13-RT43.

The operation of the wireless power transmitting and receiving device 13 in the transmitting mode will now be described with reference to FIGS. 13 and 14.

The booster 1331 may boost a voltage of power supplied from the power unit 23 (i.e. a voltage of the node N53) and output the boosted voltage to the node N43. For example, if a wireless power receiving device receiving power transmitted from the wireless power transmitting and receiving device 13 outputs charging power having a voltage of 5 V, the booster 1331 may boost and output the voltage of the node N53 in such a manner that the voltage of the node N43 may be about 7-8 V. However, this is merely an example, and a voltage supplied from the power unit 23 may be boosted to various values by the booster 1331.

Operations and characteristics of the control unit 143 and the bridge circuit 1332 and a process of transmitting power through a section between the transmitting and receiving terminal TRT3 and the common terminal TC3 of the transmitting and receiving coil L3 of the transmitting and receiving unit 113 in the transmitting mode may be similar to those described above with reference to FIG. 8.

The control unit 143 may maintain frequencies of the control signals ct13, ct23, ct33, and ct43 while regulating the voltage v_TRT3 between the transmitting and receiving terminal TRT3 and the common terminal TC3 of the transmitting and receiving coil L3 of the transmitting and receiving unit 113 by regulating a boosting ratio of the booster 1331.

Alternatively, the control unit 143 may regulate the voltage v_TRT3 between the transmitting and receiving terminal TRT3 and the common terminal TC3 of the transmitting and receiving coil L3 of the transmitting and receiving unit 113 by controlling both the boosting ratio of the booster 1331 and the frequencies of the control signals ct13, ct23, ct33, and ct43.

Figure 15:
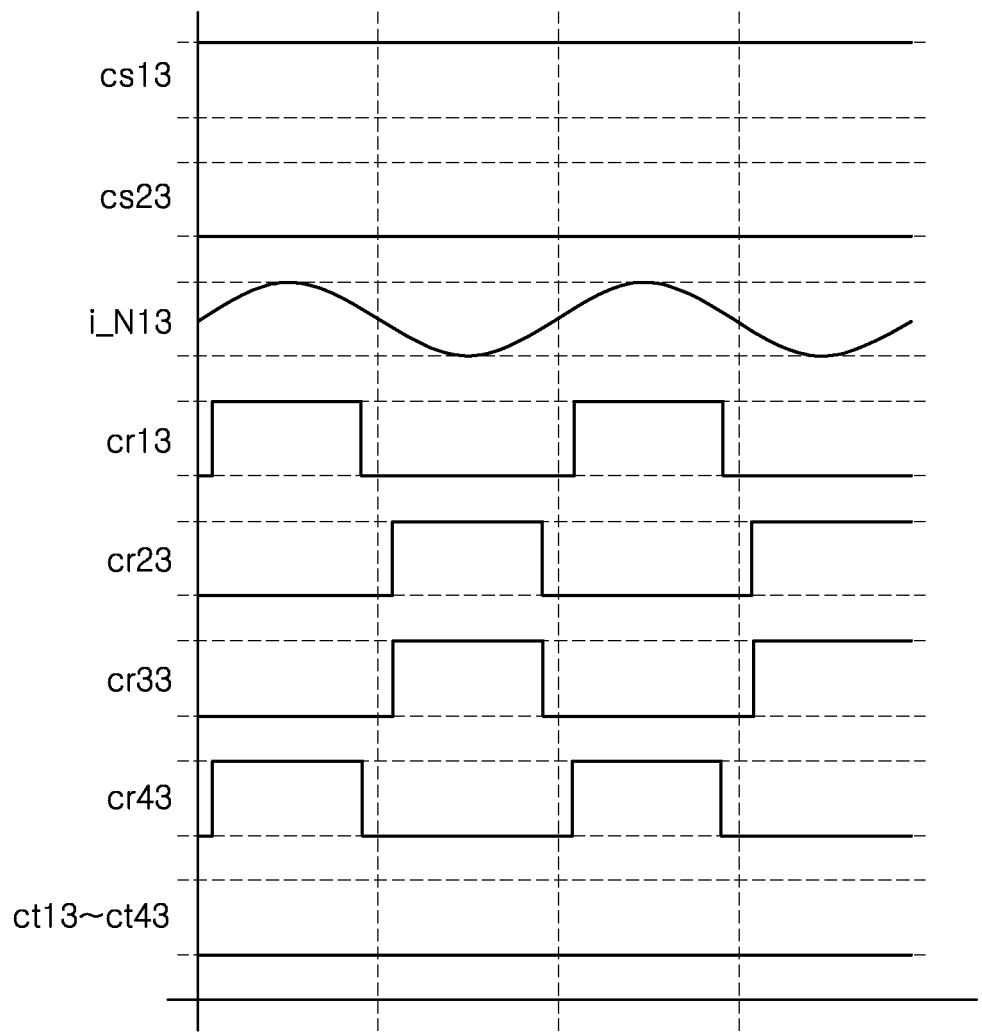
FIG. 15 is a timing diagram illustrating an operation of a wireless power transmitting and receiving device of FIG. 13 in a receiving mode.

FIG. 15 is a timing diagram illustrating an example of an operation of the wireless power transmitting and receiving device 13 of FIG. 13 in a receiving mode. In FIG. 15, cs13 denotes a switch control signal applied to the switch S13, cs23 denotes a switch control signal applied to the switch S23, cr13 denotes a control signal applied to the transistor RT13, cr23 denotes a control signal applied to the transistor RT23, cr33 denotes a control signal applied to the transistor RT33, cr43 denotes a control signal applied to the transistor RT43, and i_N13 denotes a current flowing from the transmitting and receiving unit 113 to the rectifying unit 123 through the node N13.

The operation and characteristics of the wireless power transmitting and receiving device 13 in the receiving mode may be similar to those described above with reference to FIGS. 9, 13, and 15.

Figure 16:
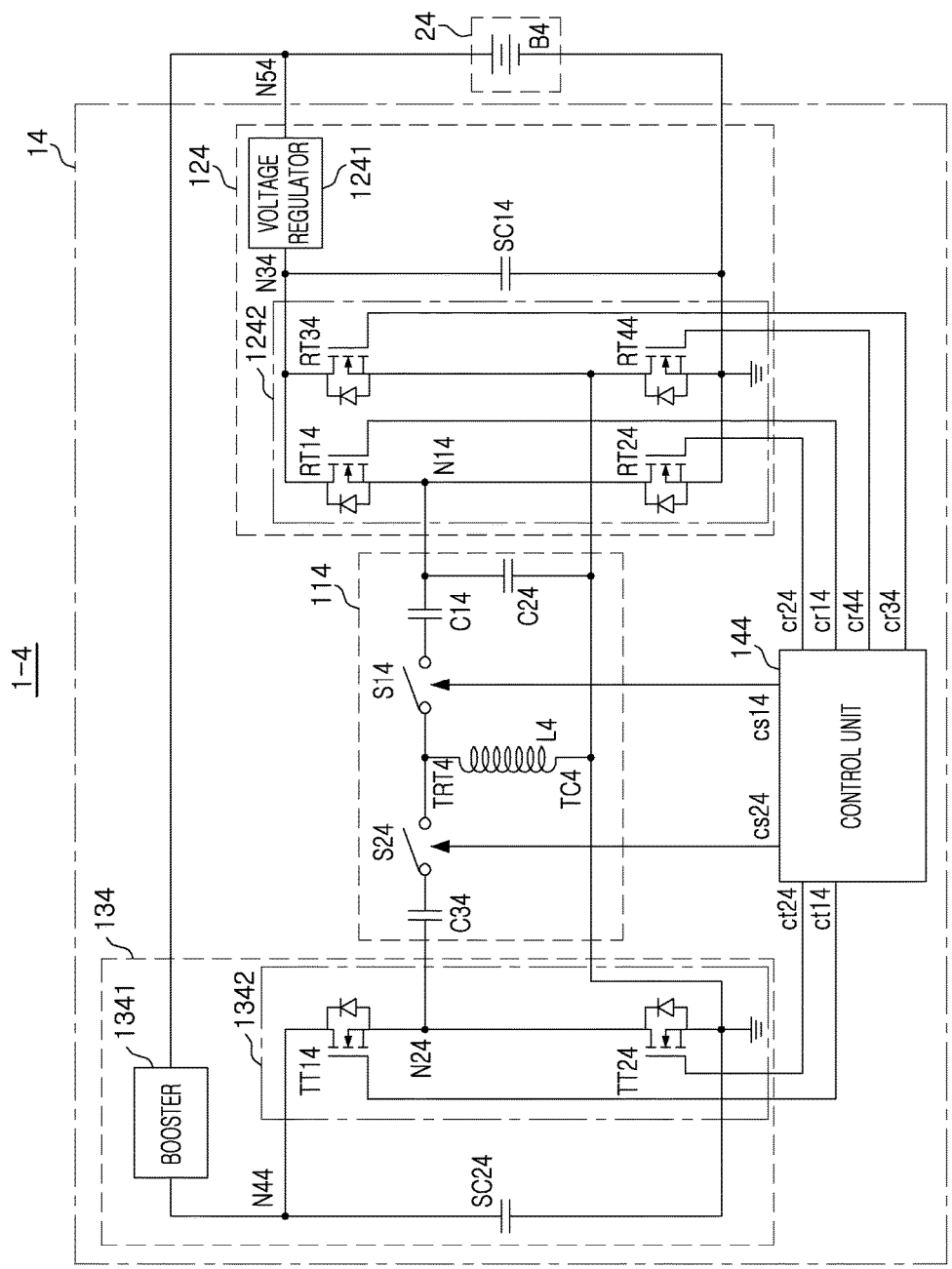
FIG. 16 is a schematic diagram illustrating an example of an apparatus including a wireless power transmitting and receiving device.

FIG. 16 is a schematic diagram of an example of an apparatus 1-4 including a wireless power transmitting and receiving device 14. The apparatus 1-4 includes the wireless power transmitting and receiving device 14 and a power unit 24. The wireless power transmitting and receiving device 14 includes a transmitting and receiving unit 114, a rectifying unit 124, a converting unit 134, and a control unit 144. That is, FIG. 16, a converting and rectifying unit (120 of FIG. 6) includes the rectifying unit 124 including bridge circuit 1242 and the converting unit 134 including bridge circuit 1342.

The transmitting and receiving unit 114 may receive wirelessly transmitted power and transmit the power wirelessly. The transmitting and receiving unit 114 includes a transmitting and receiving coil L4, a switch S14, a capacitor C14, a capacitor C24, a switch S24, and a capacitor C34.

The transmitting and receiving coil L4 may include: a common terminal TC4 connected to the rectifying unit 124 and the converting unit 134 in a receiving mode in which the wirelessly transmitted power is received and a transmitting mode in which the power is transmitted wirelessly; and a transmitting and receiving terminal TRT4 connected to the rectifying unit 124 in the receiving mode and connected to the converting unit 134 in the transmitting mode.

The switch S14 may be connected to the transmitting and receiving terminal TRT4, may be turned on in the receiving mode, and may be turned off in the transmitting mode according to the control of the control unit 144. The capacitor C14 may be connected between the switch S14 and a node N14. The capacitor C24 may be connected between the node N14 and the common terminal TC4. In the receiving mode, a section of the transmitting and receiving coil L4 between the common terminal TC4 and the transmitting and receiving terminal TRT4 and the capacitor C14 (or the capacitor C14 and the capacitor C24) may form a resonance tank. Operation and characteristics of the capacitor C24 may be similar to those of the capacitor C21 of FIG. 7.

The switch S24 may be connected to the transmitting and receiving terminal TRT4, may be turned off in the receiving mode, and may be turned on in the transmitting mode according to the control of the control unit 144. The capacitor C34 may be connected between the switch S24 and a node N24. In the transmitting mode, the section of the transmitting and receiving coil L4 between the common terminal TC4 and the transmitting and receiving terminal TRT4 and the capacitor C34 may form a resonance tank.

The rectifying unit 124 may be connected to the node N14 and the common terminal TC4, may rectify a voltage between the node N14 and the common terminal TC4 in the receiving mode, and may output a charging voltage according to the control of the control unit 144. The rectifying unit 124 includes bridge circuit 1242, a smoothing capacitor SC14, and a voltage regulator 1241.

The bridge circuit 1242 may rectify the voltage between the node N14 and the common terminal TC4 and may output the rectified voltage to a node N34 according to the control of the control unit 144. The bridge circuit 1242 includes a transistor RT14 connected between the node N14 and the node N34, a transistor RT24 connected between the node N14 and a ground, a transistor RT34 connected between the node N34 and the common terminal TC4, and a transistor RT44 connected between the common terminal TC4 and the ground. Each of the transistors RT14, RT24, RT34, and RT44 included in the bridge circuit 1242 may be a field effect transistor including a parasitic diode, but is not limited thereto.

The smoothing capacitor SC14 may be connected between the node N34 and the ground, and may smooth a voltage of the node N34, i.e., the rectified voltage.

The voltage regulator 1241 may receive the voltage of the node N34, i.e., the rectified voltage, and output a charging voltage having a consistent value irrespective of a variation of the rectified voltage or a variation of a load. A low drop out (LDO) regulator, etc. may be included in as the voltage regulator 1241.

The converting unit 134 may be connected to a node N24 and the common terminal TC4, may boost a voltage of the power supplied from the power unit 24 in the transmitting mode according to the control of the control unit 144, and may apply alternating current voltage to the node N24 and both ends of the common terminal TC4 by using the boosted voltage. The converting unit 134 includes a booster 1341, bridge circuit 1342, and a smoothing capacitor SC24.

The booster 1341 may boost and output the voltage of the power supplied from the power unit 24. That is, the booster 1341 may boost a voltage from a node N54 and output the voltage to a node N44.

The bridge circuit 1342 may generate an alternating current voltage using the voltage output by the booster 1341, i.e., the voltage of the node N44, according to the control of the control unit 144. That is, the bridge circuit 1342 may operate as a half bridge inverter. The bridge circuit 1342 may include a transistor TT14 connected between the node N44 and the node N24 and a transistor TT24 connected between the node N24 and the ground. The common terminal TC4 of the transmitting and receiving coil L4 may be connected to the ground in the transmitting mode. Each of the transistors TT14 and TT24 included in the bridge circuit 1342 may be a field effect transistor including a parasitic diode, but is not limited thereto.

The smoothing capacitor SC24 may smooth the voltage output by the booster 1341, i.e., the voltage of the node N44.

Operation and characteristics of each of the control unit 144 and the power unit 24 may be similar to those described above with reference to the control unit 141 and the power unit 21, respectively, of FIG. 7.

Figure 17:
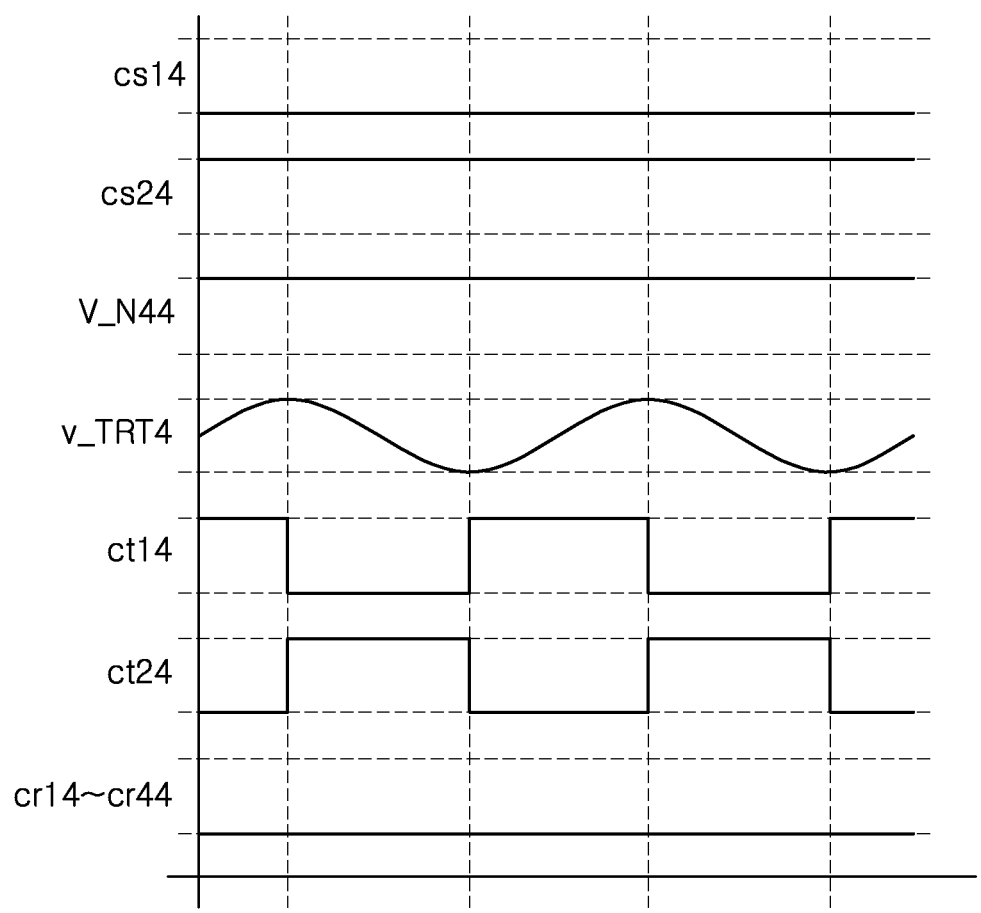
FIG. 17 is a timing diagram illustrating an example of an operation of a wireless power transmitting and receiving device of FIG. 16 in a transmitting mode.

FIG. 17 is a timing diagram illustrating an example of the wireless power transmitting and receiving device 14 of FIG. 16 in a transmitting mode. In FIG. 17, cs14 denotes a switch control signal applied to the switch S14, cs24 denotes a switch control signal applied to the switch S24, ct14 denotes a control signal applied to the transistor TT14, ct24 denotes a control signal applied to the transistor TT24, V_N44 denotes a voltage of the node N44, v_TRT4 denotes a voltage between the transmitting and receiving terminal TRT4 and the common terminal TC4 of the transmitting and receiving coil L4, and cr14-cr44 denote control signals respectively applied to the transistors RT14-RT44.

The operation of the wireless power transmitting and receiving device 14 in the transmitting mode will now be described with reference to FIGS. 16 and 17.

The booster 1341 may boost a voltage of power supplied from the power unit 24 (i.e., a voltage of the node N54) and output the boosted voltage to the node N44. For example, if a wireless power receiving device receiving power transmitted from the wireless power transmitting and receiving device 14 outputs charging power having a voltage of 5 V, the booster 1341 may boost and output the voltage of the node N54 in such a manner that the voltage of the node N44 may be about 15-16 V. However, this is merely an example, and a voltage supplied from the power unit 24 may be boosted to various values by the booster 1341.

To operate the wireless power transmitting and receiving device 14 in the transmitting mode, the control unit 144 may output the switch control signal cs14 to a relatively low level and the switch control signal cs24 to a relatively high level. Thus, the switch S14 may be turned off, and the switch S24 may be turned on. That is, the transmitting and receiving coil L4 may be electrically connected to the converting unit 134. In this configuration, the transmitting and receiving terminal TRT4 and the common terminal TC4 of the transmitting and receiving coil L4 may be electrically connected to the converting unit 134.

The control unit 144 may output the control signals ct14 and ct24 for controlling the bridge circuit 1342 of the converting unit 134. The control signals ct14 and ct24 may be a square wave having a duty ratio of 50%. The control signals ct14 and ct24 may have opposite phases. Thus, the transistors TT14 and TT24 may be complementarily turned on and off. That is, the bridge circuit 1342 of the converting unit 134 may operate as a half bridge inverter.

According to operation of the bridge circuit 1342, alternating current voltage may be applied between the node N24 and the common terminal TC4 of the transmitting and receiving coil L4, and thus the alternating current voltage may also be applied between the transmitting and receiving terminal TRT4 and the common terminal TC4 of the transmitting and receiving coil L4. Therefore, the power may be transmitted wirelessly through a section of the transmitting and receiving coil L4 between the transmitting and receiving terminal TRT4 and the common terminal TC4.

An amplitude of the voltage v_TRT4 between the transmitting and receiving terminal TRT4 and the common terminal TC4 of the transmitting and receiving coil L4 may be determined by frequencies of the control signals ct14 and ct24. Operation and characteristics by which the control unit 144 determines the frequencies of the control signals ct14 and ct24 may be similar to those described above with reference to FIG. 8.

The control unit 144 may output all of the control signals cr14, cr24, cr34, and cr44 having a relatively low level in such a manner that the bridge circuit 1242 of the rectifying unit 124 may not operate in the transmitting mode.

The control unit 144 may maintain frequencies of the control signals ct14 and ct24 while regulating the voltage v_TRT4 between the transmitting and receiving terminal TRT4 and the common terminal TC4 of the transmitting and receiving coil L4 of the transmitting and receiving unit 114 by regulating a boosting ratio of the booster 1341.

Alternatively, the control unit 144 may regulate the voltage v_TRT4 between the transmitting and receiving terminal TRT4 and the common terminal TC4 of the transmitting and receiving coil L4 of the transmitting and receiving unit 114 by controlling both the boosting ratio of the booster 1341 and the frequencies of the control signals ct14 and ct24.

Figure 18:
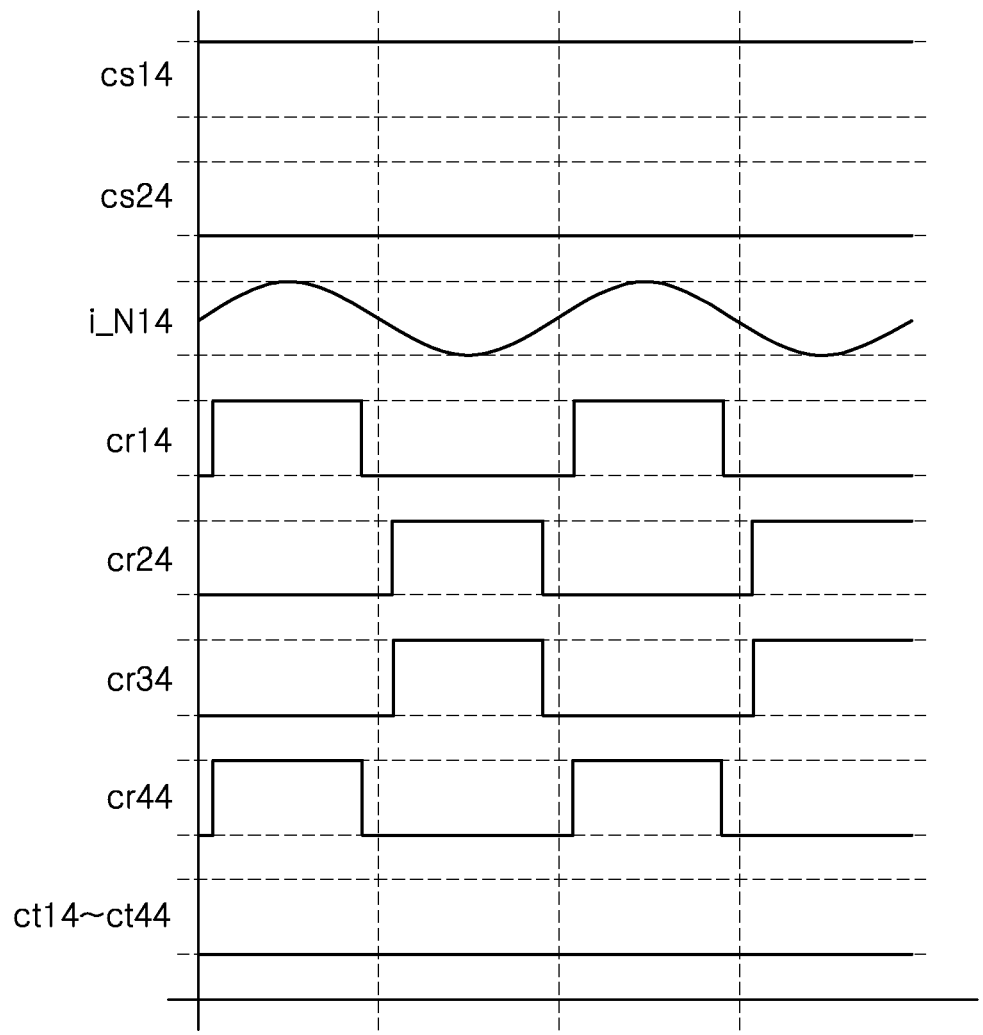
FIG. 18 is a timing diagram illustrating an example of an operation of a wireless power transmitting and receiving device of FIG. 16 in a receiving mode.

FIG. 18 is a timing diagram illustrating an example of an operation of the wireless power transmitting and receiving device 14 of FIG. 16 in a receiving mode. In FIG. 18, cs14 denotes a switch control signal applied to the switch S14, cs24 denotes a switch control signal applied to the switch S24, cr14 denotes a control signal applied to the transistor RT14, cr24 denotes a control signal applied to the transistor RT24, cr34 denotes a control signal applied to the transistor RT34, cr44 denotes a control signal applied to the transistor RT44, and i_N14 denotes a current flowing from the transmitting and receiving unit 114 to the rectifying unit 124 through the node N14.

The operation and characteristics of the wireless power transmitting and receiving device 14 in the receiving mode may be similar to those described above with reference to FIGS. 9, 16, and 18.

Figure 19:
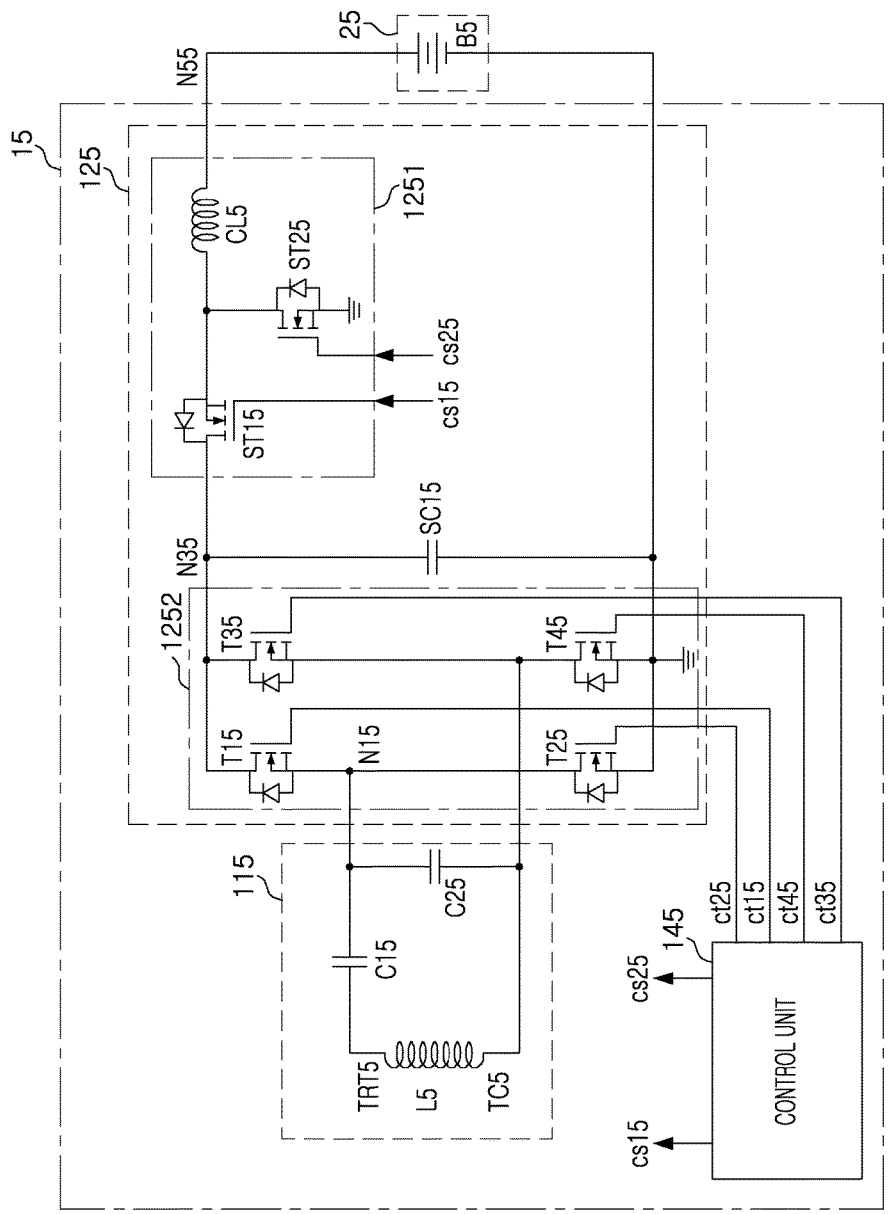
FIG. 19 is a schematic diagram illustrating an example of an apparatus including a wireless power transmitting and receiving device.

FIG. 19 is a schematic diagram illustrating an example of an apparatus 1-5 including a wireless power transmitting and receiving device 15. The apparatus 1-5 includes the wireless power transmitting and receiving device 15 and a power unit 25. The wireless power transmitting and receiving device 15 includes a transmitting and receiving unit 115, a converting and rectifying unit 125, and a control unit 145. That is, in FIG. 19, bridge circuit 1252 of the converting and rectifying unit 125 may rectify received power and generate charging power, and generate alternating current power from externally-supplied power.

The transmitting and receiving unit 115 may receive wirelessly transmitted power and may transmit the power wirelessly. The transmitting and receiving unit 115 includes a transmitting and receiving coil L5, a capacitor C15, and a capacitor C25.

The transmitting and receiving coil L5 may include: a common terminal TC5 connected to the converting and rectifying unit 125; and a transmitting and receiving terminal TRT5 in a receiving mode in which the wirelessly transmitted power is received and a transmitting mode in which the power is transmitted wirelessly.

The capacitor C15 may be connected between the transmitting and receiving terminal TRT5 and a node N15. The capacitor C25 may be connected between the node N15 and the common terminal TC5. Therefore, in the receiving mode, a section TRT5 of the transmitting and receiving coil L5 between the common terminal TC5 and the transmitting and receiving terminal and the capacitor C15 (or the capacitor C15 and the capacitor C25) may form a resonance tank.

In the transmitting mode, the section of the transmitting and receiving coil L5 between the common terminal TC5 and the transmitting and receiving terminal TRT5 and the capacitor C15 may form a resonance tank. Operation and characteristics of the capacitor C25 may be similar to those described above with reference to the capacitor C21 of FIG. 7.

The converting and rectifying unit 125 may be connected to the node N15 and the common terminal TC5, may rectify a voltage between the node N15 and the common terminal TC5 to output a charging voltage in the receiving mode, and may apply the alternating current voltage to the node N15 and both ends of the common terminal TC5 in the transmitting mode according to the control of the control unit 145. The converting and rectifying unit 125 includes bridge circuit 1252, a smoothing capacitor SC15, and a bi-directional DC-DC converter 1251.

The bridge circuit 1252 may rectify the voltage between the node N15 and the common terminal TC5 to output the rectified voltage to a node N35 in the receiving mode and may output the alternating current voltage to the node N15 and the common terminal TC5 by using the voltage of the node N35 in the transmitting mode according to the control of the control unit 145. The bridge circuit 1252 includes a transistor T15 connected between the node N15 and the node N35, a transistor T25 connected between the node N15 and a ground, a transistor T35 connected between the node N35 and the common terminal TC5, and a transistor T45 connected between the common terminal TC5 and the ground. Each of the transistors T15, T25, T35, and T45 includes the bridge circuit 1252 may be a field effect transistor including a parasitic diode, but is not limited thereto.

The smoothing capacitor SC15 may be connected between the node N35 and the ground, and may smooth the voltage of the node N35.

The bi-directional DC-DC converter 1251 may receive the voltage of the node N35 and output a charging voltage having a consistent value irrespective of a variation of the voltage of the node N35 or a variation of a load in the receiving mode to the node N35, and may boost the voltage of the node N55 and output the voltage to the node N35 in the transmitting mode according to the control of the control unit 145. As shown in FIG. 19, the bi-directional DC-DC converter 1251 may include a transistor ST15 having one end connected to the node N35, a transistor ST25 connected between another end of the transistor ST15 and the ground, and a coil CL5 connected between the other end of the transistor ST15 and a node N55. Each of the transistors ST15 and ST25 may be a field effect transistor including a parasitic diode, but are not limited thereto.

The bi-directional DC-DC converter 1251 may perform a similar operation to a buck converter in the receiving mode and may perform a similar operation to a boost converter in the transmitting mode.

Operation and characteristics of the control unit 145 and the power unit 25 may be similar to those described above with reference to the control unit 141 and the power unit 21, respectively, of FIG. 7.

Figure 20:
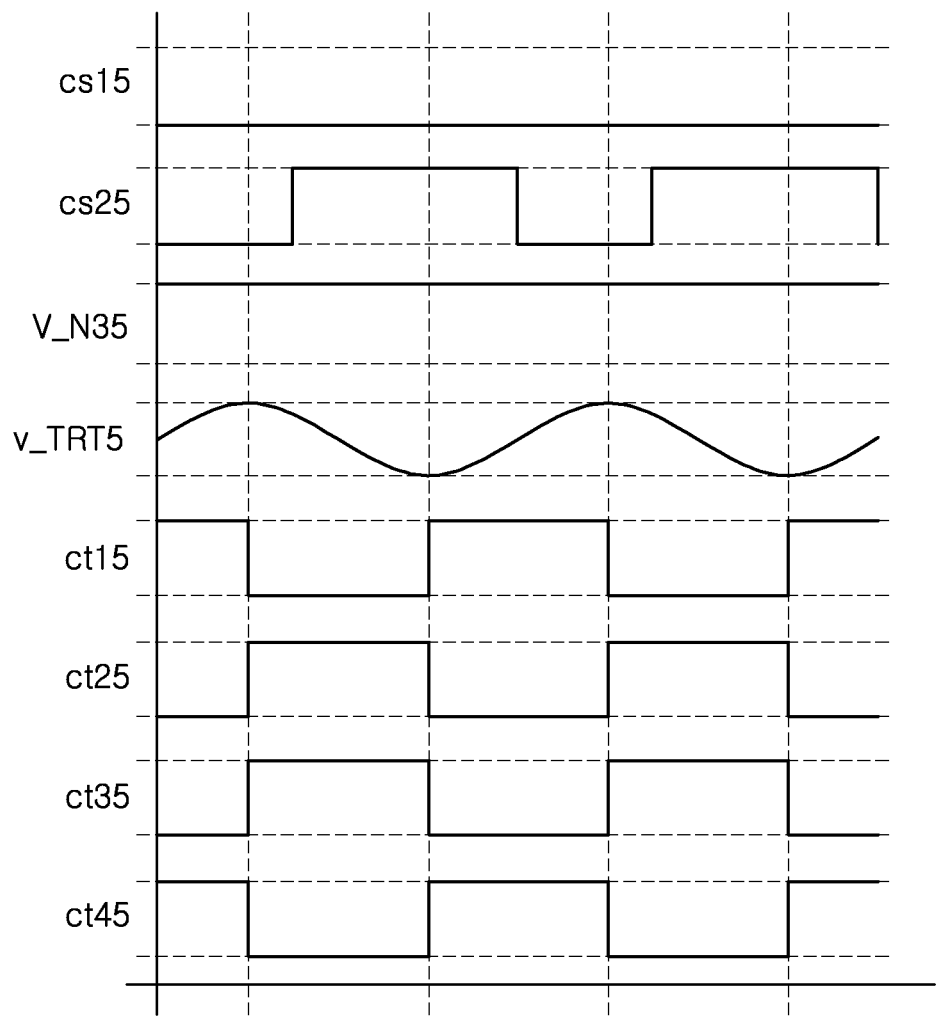
FIG. 20 is a timing diagram illustrating an example of an operation of a wireless power transmitting and receiving device of FIG. 19 in a transmitting mode.

FIG. 20 is a timing diagram illustrating an example of the wireless power transmitting and receiving device 15 of FIG. 19 in a transmitting mode. In FIG. 20, cs15 denotes a control signal applied to the transistor ST15, cs25 denotes a control signal applied to the transistor ST25, ct15 denotes a control signal applied to the transistor T15, ct25 denotes a control signal applied to the transistor T25, ct35 denotes a control signal applied to the transistor T35, ct45 denotes a control signal applied to the transistor T45, V_N35 denotes a voltage of the node N35, and v_TRT5 denotes a voltage between the transmitting and receiving terminal TRT5 and the common terminal TC5 of the transmitting and receiving coil L5.

The operation of the wireless power transmitting and receiving device 15 in the transmitting mode will now be described with reference to FIGS. 19 and 20.

To operate the wireless power transmitting and receiving device 15 in the transmitting mode, the control unit 145 may output the control signal cs15 at a relatively low level and the control signal cs25 having a square wave form. Thus, the transistor ST15 may be turned off and may operate in the same manner as a diode, and the transistor ST25 may be turned on and off according to the control signal cs25. The control unit 145 may maintain the voltage of the node N35 as a uniform value by regulating a duty ratio of the control signal cs25 according to the voltage of the node N35. For example, if a wireless power receiving device receiving power transmitted from the wireless power transmitting and receiving device 15 outputs charging power having a voltage of 5 V, the control unit 145 may regulate the duty ratio of the control signal cs25 such that the voltage of the node N35 may be about 7-8 V. However, this is merely an example, and a voltages of the charging power and the node 35 may vary according to use. That is, the bi-directional DC-DC converter 1251 may perform in the same manner as a boost converter in the transmitting mode.

Although FIG. 20 illustrates a case in which the control unit 145 outputs the control signal cs15 at a relatively low level, the control unit 145 may output a complementary signal with the control signal cs25 as the control signal cs15. In this case, the transistor ST15 may be turned on and off complementarily with the transistor ST25, and the bi-directional DC-DC converter 1251 may perform similarly to a synchronous boost converter.

The control unit 145 may output the control signals ct15, ct25, ct35, and ct45 for controlling the bridge circuit 1252 of the converting and rectifying unit 125. The control signals ct15, ct25, ct35, and ct45 may be a square wave having a duty ratio of 50%. The control signals ct15 and ct45 and the control signals ct25 and ct35 may have opposite phases. Thus, the transistors T15 and T45 and the transistors T25 and T35 may be complementarily turned on and off. As shown in FIG. 20, the bridge circuit 1252 of the converting and rectifying unit 125 may operate as a full bridge inverter in the transmitting mode.

According to operation of the bridge circuit 1252, alternating current voltage may be applied between the node N15 and the common terminal TC5 of the transmitting and receiving coil L5, and thus the alternating current voltage may also be applied between the transmitting and receiving terminal TRT5 and the common terminal TC5 of the transmitting and receiving coil L5. The power may be transmitted wirelessly through a section of the transmitting and receiving coil L5 between the transmitting and receiving terminal TRT5 and the common terminal TC5.

An amplitude of the voltage v_TRT5 between the transmitting and receiving terminal TRT5 and the common terminal TC5 of the transmitting and receiving coil L5 may be determined by frequencies of the control signals ct15, ct25, ct35, and ct45. The method in which the control unit 145 determines the frequencies of the control signals ct15, ct25, ct35, and ct45 may be similar to that described above with reference to FIG. 8.

The control unit 145 may maintain frequencies of the control signals ct15, ct25, ct35, and ct45 while regulating the voltage v_TRT5 between the transmitting and receiving terminal TRT5 and the common terminal TC5 of the transmitting and receiving coil L5 of the transmitting and receiving unit 115 by regulating the duty ratio of the control signal cs25 and regulating the voltage of the node N35.

Alternatively, the control unit 145 may regulate the voltage v_TRT5 between the transmitting and receiving terminal TRT5 and the common terminal TC5 of the transmitting and receiving coil L5 of the transmitting and receiving unit 115 by controlling both the duty ratio of the control signal cs25 and the frequencies of the control signals ct15, ct25, ct35, and ct45.

Figure 21:
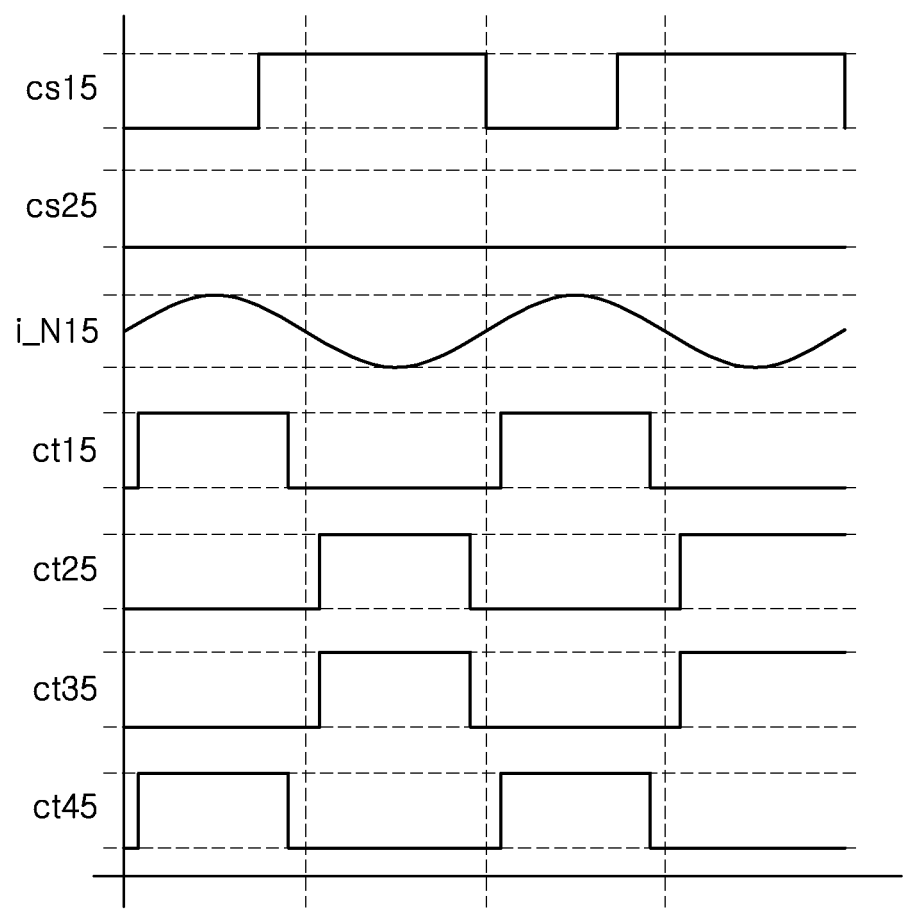
FIG. 21 is a timing diagram illustrating an example of an operation of a wireless power transmitting and receiving device of FIG. 19 in a receiving mode.

FIG. 21 is a timing diagram illustrating an example of an operation of the wireless power transmitting and receiving device 15 of FIG. 19 in a receiving mode. In FIG. 21, cs15 denotes a control signal applied to the transistor ST15, cs25 denotes a control signal applied to the transistor ST25, ct15 denotes a control signal applied to the transistor T15, ct25 denotes a control signal applied to the transistor T25, ct35 denotes a control signal applied to the transistor T35, ct45 denotes a control signal applied to the transistor T45, and i_N15 denotes a current flowing from the transmitting and receiving unit 115 to the converting and rectifying unit 125 through the node N15.

The operation of the wireless power transmitting and receiving device 15 in the receiving mode will now be described with reference to FIGS. 19 and 21.

To operate the wireless power transmitting and receiving device 15 in the receiving mode in which wirelessly transmitted power is received, the control unit 145 may output the control signal cs15 having a square wave form and the control signal cs25 at a relatively low level. Thus, the transistor ST15 may be turned on and off according to the control signal cs15, and the transistor ST25 may be turned off. The control unit 145 may maintain a voltage of the node N55 as a uniform value by regulating a duty ratio of the control signal cs15 according to the voltage of the node N55. For example, if the voltage of the node N55 is less than a threshold voltage, the control unit 145 may increase the duty ratio of the control signal cs15, and if the voltage of the node N55 is greater than the threshold voltage, the control unit 145 may reduce the duty ratio of the control signal cs15. Thus, in the receiving mode, the bi-directional DC-DC converter 1251 may operate similarly to a buck converter.

Although FIG. 21 illustrates a case in which the control unit 145 outputs the control signal cs25 at a relatively low level, the control unit 145 may output a complementary signal with the control signal cs15 as the control signal cs25. In this case, the transistor ST25 may be turned on and off complementarily with the transistor ST15, and the bi-directional DC-DC converter 1251 may similarly to a synchronous buck converter.

If the transmitting and receiving unit 115 of the wireless power transmitting and receiving device 15 receives the wirelessly transmitted power, the current i_N15 of FIG. 21 may flow from the transmitting and receiving unit 115 to the converting and rectifying unit 125 through the node N15. The power may be received through a section between the common terminal TC5 and the transmitting and receiving terminal TRT5 of the transmitting and receiving coil L5.

The control unit 145 may output the control signals ct15, ct25, ct35, and ct45 for controlling the bridge circuit 1252 of the converting and rectifying unit 125. To this end, the control unit 145 may receive voltage of both ends of at least one of the transistors T15, T25, T35, and T45 of the bridge circuit 1252. For example, the control unit 145 may output the control signals ct15 and ct45 in response to the voltage of both ends of the transistor T15 and the control signals ct25 and ct35 in response to the voltage of both ends of the transistor T25. If the voltage of both ends of the transistor T15 is less than a first reference value, the control unit 145 may change a state of the control signals ct15 and ct45 from the relatively low level to the relatively high level, and if the voltage of both ends of the transistor T15 is greater than a second reference value, the control unit 145 may change the state of the control signals ct15 and ct45 from the relatively high level to the relatively low level. If the voltage of both ends of the transistor T25 is less than a third reference value, the control unit 145 may change a state of the control signals ct25 and ct35 from the relatively low level to the relatively high level, and if the voltage of both ends of the transistor T25 is greater than a fourth reference value, the control unit 145 may change the state of the control signals ct25 and ct35 from the relatively high level to the relatively low level.

Operation and characteristics of bridge circuit 1252 may be similar to those describe above with reference to FIG. 9.

In the receiving mode, a rectified voltage may be output to the node N35 by the operations of the bridge circuit 1252. The voltage of the node N55 may be maintained as charging voltage by the bi-directional DC-DC converter 1251 operating similarly to a buck converter. A battery B5 of the power unit 25 may be charged with the charging voltage of the node N55.

Figure 22:
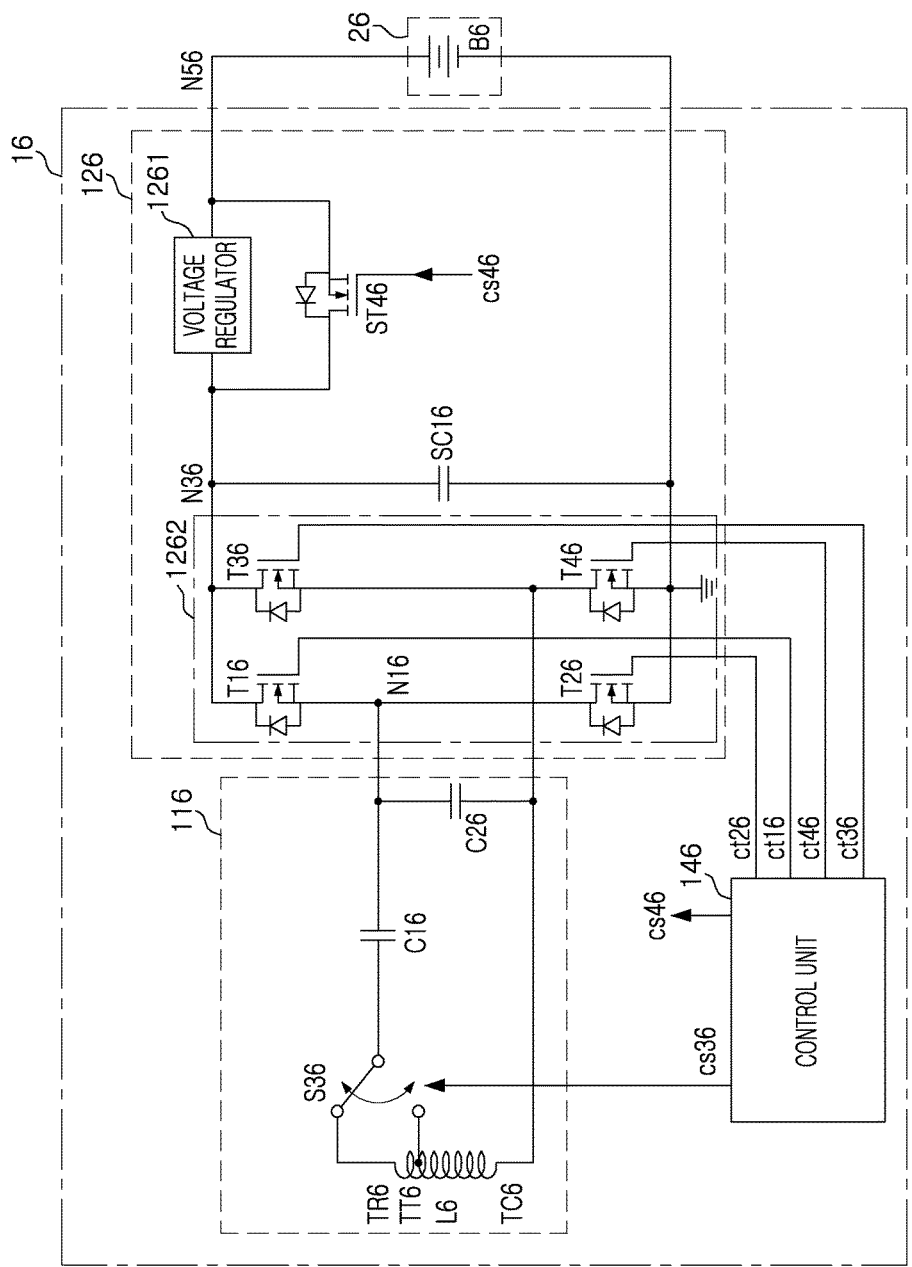
FIG. 22 is a schematic diagram illustrating an example of an apparatus including a wireless power transmitting and receiving device.

FIG. 22 is a schematic diagram of an example of an apparatus 1-6 including a wireless power transmitting and receiving device 16. The apparatus 1-6 includes the wireless power transmitting and receiving device 16 and a power unit 26. The wireless power transmitting and receiving device 16 includes a transmitting and receiving unit 116, a converting and rectifying unit 126, and a control unit 146. That is, in FIG. 22, bridge circuit 1262 of the converting and rectifying unit 126 may rectify received power and generate charging power, and generate alternating current power from an externally-supplied power.

The transmitting and receiving unit 116 may receive wirelessly transmitted power and may transmit the power wirelessly. The transmitting and receiving unit 116 includes a transmitting and receiving coil L6, a switch S36, a capacitor C16, and a capacitor C26.

The transmitting and receiving coil L6 may include: a common terminal TC6 connected to the converting and rectifying unit 126 in a receiving mode in which the wirelessly transmitted power is received and a transmitting mode in which the power is transmitted wirelessly, a receiving terminal TR6 connected to the converting and rectifying unit 126 in the receiving mode, and a transmitting terminal TT6 connected to the converting and rectifying unit 126 and disposed between the receiving terminal TR6 and the common terminal TC6 in the transmitting mode. The transmitting terminal TT6 may be a tab disposed between the ends of the transmitting and receiving coil L6. The number of turns between the common terminal TC6 and the receiving terminal TR6 of the transmitting and receiving coil L6 may be, for example, 12 through 15. The number of turns between the common terminal TC6 and the transmitting terminal TT6 may be 10, but is not limited thereto.

The switch S36 may connect the receiving terminal TR6 and one end of the capacitor C16 in the receiving mode and may connect the transmitting terminal TT6 and one end of the capacitor C16 in the transmitting mode according to the control of the control unit 146.

The capacitor C16 may be connected between the switch S36 and a node N16. The capacitor C26 may be connected between the node N16 and the common terminal TC6. In the receiving mode, a section of the transmitting and receiving coil L6 between the common terminal TC6 and the receiving terminal TR6 and the capacitor C16 (or the capacitor C16 and the capacitor C26) may form a resonance tank. In the transmitting mode, the section of the transmitting and receiving coil L6 between the common terminal TC6 and the transmitting terminal TT6 and the capacitor C16 may form a resonance tank. Operation and characteristics of the capacitor C26 may be similar to those of the capacitor C21 of FIG. 7.

The converting and rectifying unit 126 may be connected to the node N16 and the common terminal TC6, may rectify a voltage between the node N16 and the common terminal TC6 to output a charging voltage in the receiving mode, and may apply the alternating current voltage to the node N16 and both ends of the common terminal TC6 in the transmitting mode according to the control of the control unit 146. The converting and rectifying unit 126 includes bridge circuit 1262, a smoothing capacitor SC16, a switch ST46, and a voltage regulator 1261.

The bridge circuit 1262 may rectify the voltage between the node N16 and the common terminal TC6 to output the rectified voltage to a node N36 in the receiving mode and may output the alternating current voltage to the node N16 and the common terminal TC6 by using the voltage of the node N36 in the transmitting mode according to the control of the control unit 146. The bridge circuit 1262 includes a transistor T16 connected between the node N16 and the node N36, a transistor T26 connected between the node N16 and a ground, a transistor T36 connected between the node N36 and the common terminal TC6, and a transistor T46 connected between the common terminal TC6 and the ground. Each of the transistors T16, T26, T36, and T46 included in the bridge circuit 1262 may be a field effect transistor including a parasitic diode, but is not limited thereto.

The smoothing capacitor SC16 may be connected between the node N36 and the ground, and may smooth the voltage of the node N36, i.e. the rectified voltage.

The voltage regulator 1261 may receive the voltage of the node N36, i.e., the rectified voltage, and output a charging voltage having a consistent value irrespective of a variation of the rectified voltage or a variation of a load in the receiving mode. A low drop out (LDO) regulator, etc. may be included in the voltage regulator 1261.

The switch S36 may be turned off in the receiving mode and may be turned on in the receiving mode according to the control of the control unit 146. Thus, a voltage of a node N56 that is a voltage of power supplied from the power unit 26 may be transmitted to the node N36 in the transmitting mode.

Operations and characteristics the control unit 146 and the power unit 26 may be similar to those described above with reference to the control unit 141 and the power unit 21, respectively, of FIG. 7.

Figure 23:
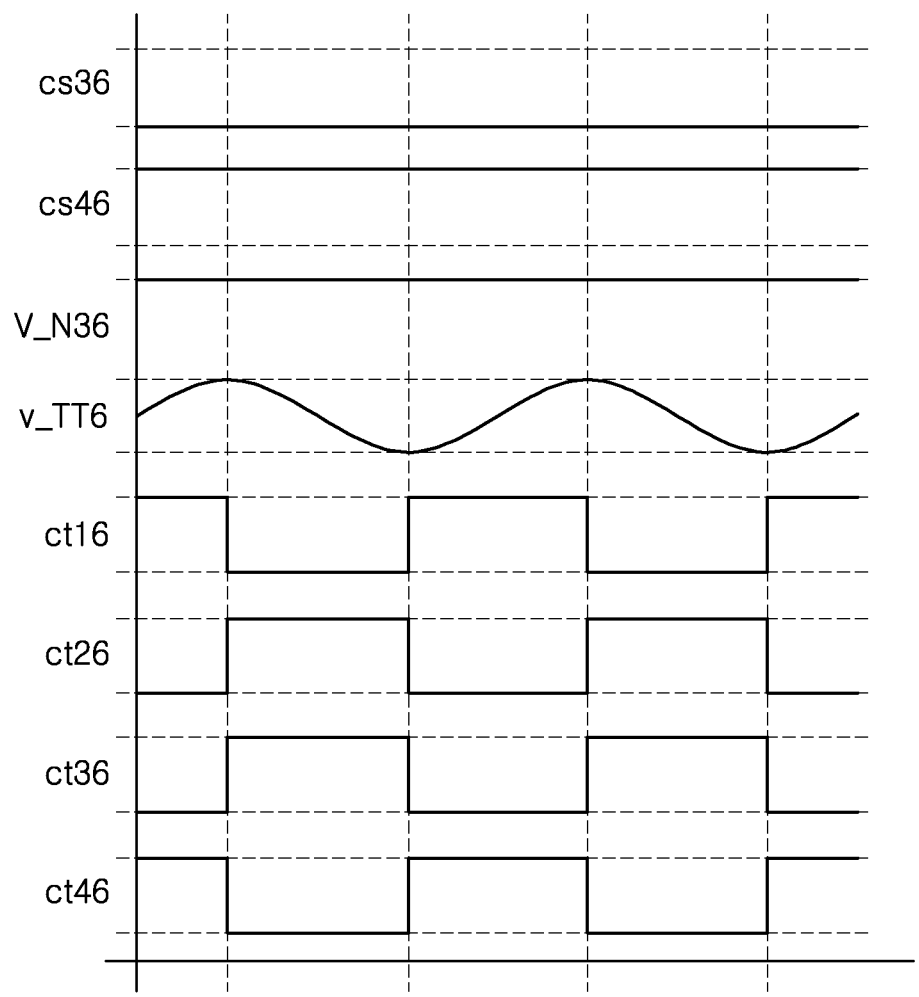
FIG. 23 is a timing diagram illustrating an example of an operation of a wireless power transmitting and receiving device of FIG. 22 in a transmitting mode.

FIG. 23 is a timing diagram illustrating an example of an operation of the wireless power transmitting and receiving device 16 of FIG. 22 in a transmitting mode. In FIG. 23, cs36 denotes a switch control signal applied to the switch S36, cs46 denotes a control signal applied to the transistor ST46, ct16 denotes a control signal applied to the transistor T16, ct26 denotes a control signal applied to the transistor T26, ct36 denotes a control signal applied to the transistor T36, ct46 denotes a control signal applied to the transistor T46, V_N36 denotes a voltage of the node N36, and v_TT6 denotes a voltage between the transmitting terminal TT6 and the common terminal TC6 of the transmitting and receiving coil L6.

The operation of the wireless power transmitting and receiving device 16 in the transmitting mode will now be described with reference to FIGS. 22 and 23.

To operate the wireless power transmitting and receiving device 16 in the transmitting mode in which power is transmitted wirelessly, the control unit 146 may output the switch control signal cs36 at a relatively low level and the control signal cs46 at a relatively high level. Thus, the switch S36 may connect one end of the capacitor C16 and the transmitting terminal TT6 of the transmitting and receiving coil L6. That is, in the transmitting mode, the transmitting terminal TT6 and the common terminal TC6 of the transmitting and receiving coil L6 may be electrically connected to the converting and rectifying unit 126. The transistor ST46 may be turned on. Thus, in the transmitting mode, the voltage V_N36 of the node N36 may be the same as an output voltage of a battery B6 of the power unit 126. The voltage V_N36 of the node N36 may also be the same as a voltage of charging power output by a wireless power receiving device receiving the power transmitted from the wireless power transmitting and receiving device 16.

The control unit 146 may output the control signals ct16, ct26, ct36, and ct46 for controlling the bridge circuit 1262 of the converting and rectifying unit 126. An operation of the control unit 146, the bridge circuit 1262 of the converting and rectifying unit 126 according to the operation of the control unit 146, and transmission of power through a section between the transmitting terminal TT6 and the common terminal TC6 of the transmitting and receiving coil L6 according to the bridge circuit 1262 will be easily understood with reference to the description of FIGS. 8 and 20.

Figure 24:
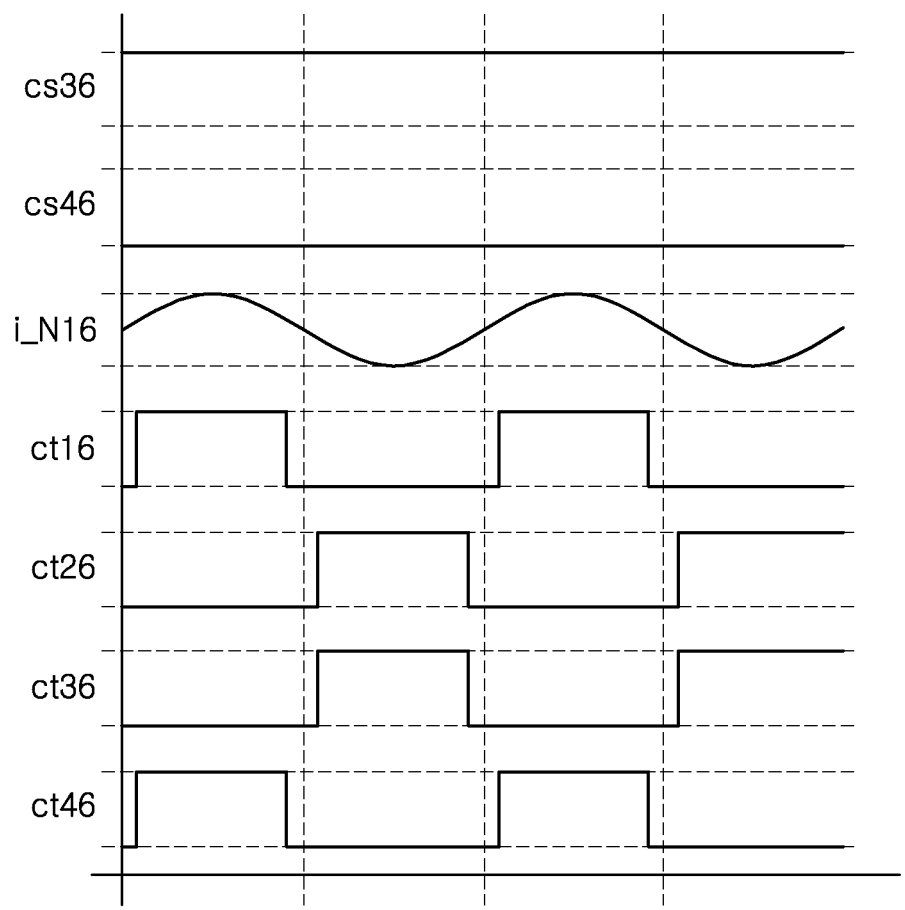
FIG. 24 is a timing diagram illustrating an example of an operation of a wireless power transmitting and receiving device of FIG. 22 in a receiving mode.

FIG. 24 is a timing diagram illustrating and example of an operation of the wireless power transmitting and receiving device 16 of FIG. 22 in a receiving mode. In FIG. 24, cs36 denotes a switch control signal applied to the switch S36, cs46 denotes a control signal applied to the transistor ST46, ct16 denotes a control signal applied to the transistor T16, ct26 denotes a control signal applied to the transistor T26, ct36 denotes a control signal applied to the transistor T36, ct46 denotes a control signal applied to the transistor T46, and i_N16 denotes a current flowing from the transmitting and receiving unit 116 to the converting and rectifying unit 126 through the node N16.

The operation of the wireless power transmitting and receiving device 16 in the receiving mode will now be described with reference to FIGS. 22 and 24.

To operate the wireless power transmitting and receiving device 16 in the receiving mode in which wirelessly transmitted power is received, the control unit 146 may output the switch control signal cs36 at a relatively high level and the control signal cs46 at a relatively low level. Thus, the switch S36 may connect one end of the capacitor C16 and the receiving terminal RT6 of the transmitting and receiving coil L6. That is, in the receiving mode, the receiving terminal RT6 and the common terminal TC6 of the transmitting and receiving coil L6 may be electrically connected to the converting and rectifying unit 126. The transistor ST46 may be turned off. Thus, in the receiving mode, the voltage of the node N56 may be determined by operation of the voltage regulator 1261.

Operation and characteristics of the control unit 146, the bridge circuit 1262 of the converting and rectifying unit 126, reception of power through the receiving terminal RT6 and the common terminal TC6 of the transmitting and receiving coil L6, and the voltage regulator 1261 in the receiving mode may be similar to those described above with reference to FIGS. 9 and 21.

Figure 25:
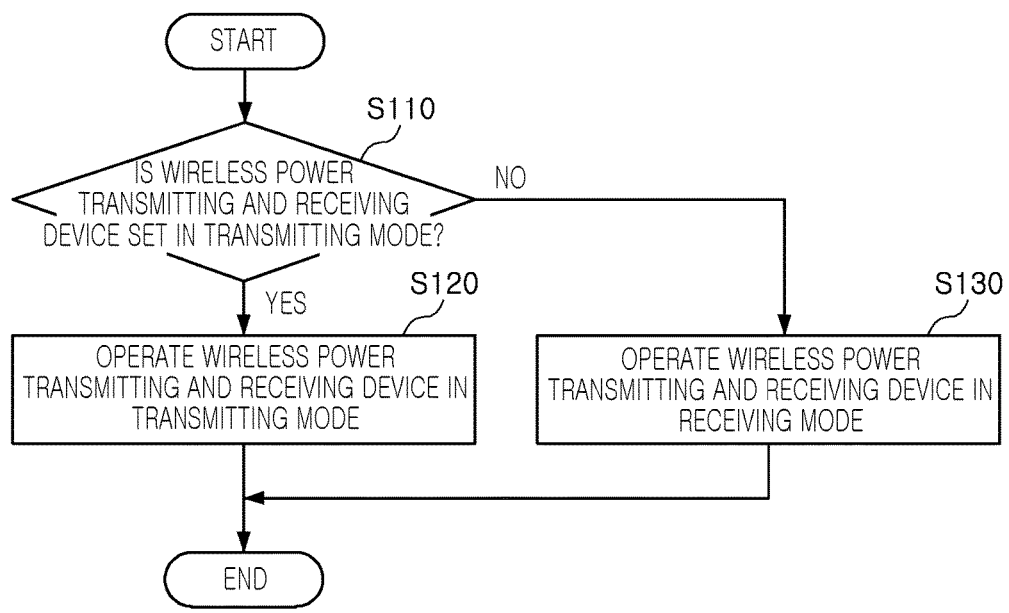
FIGS. 25 and 26 are flowcharts illustrating examples of a method of operating a wireless power transmitting and receiving device.

FIG. 25 is a flowchart illustrating an example of a method of operating a wireless power transmitting and receiving device. Operations of FIG. 25 may be performed by the control unit 140, 141, 142, 143, 144, 145, or 146 of FIGS. 6, 7, 10, 13, 16, 19, and 22, respectively.

A control unit may determine whether a transmitting mode is set (step S110). For example, in a case in which a user sets a mode of the wireless power transmitting and receiving device as the transmitting mode, a signal may be delivered to an input port of the control unit. The control unit may determine whether the mode of the wireless power transmitting and receiving device is set as the transmitting mode based on the signal of the input port.

Next, if it is determined that the mode of the wireless power transmitting and receiving device is set as the transmitting mode, the control unit may output a control signal in such a manner that the wireless power transmitting and receiving device operates in the transmitting mode (step S120). The control unit may output control signals as shown in FIG. 8, 11, 14, 17, 20, or 23, thereby controlling the wireless power transmitting and receiving device to operate in the transmitting mode.

In step S120, the control unit may control the wireless power transmitting and receiving device to operate in the transmitting mode while controlling the wireless power transmitting and receiving device to periodically operate in a receiving mode. In this case, the wireless power transmitting and receiving device may receive a supply of wireless power from an external wireless power transmitting device while transmitting the wireless power to another apparatus. In this case, the control unit may determine a time for receiving and transmitting power based on a voltage of a power unit of an apparatus including the wireless power receiving device and/or a voltage of a power unit of an apparatus including a wireless power transmitting and receiving device.

If it is determined that the mode of the wireless power transmitting and receiving device is not set as the transmitting mode, the control unit may output a control signal in such a manner that the wireless power transmitting and receiving device operates in the receiving mode (step S130). The control unit may output control signals as shown in FIG. 9, 12, 15, 18, 21, or 24, thereby controlling the wireless power transmitting and receiving device to operate in the receiving mode.

Figure 26:
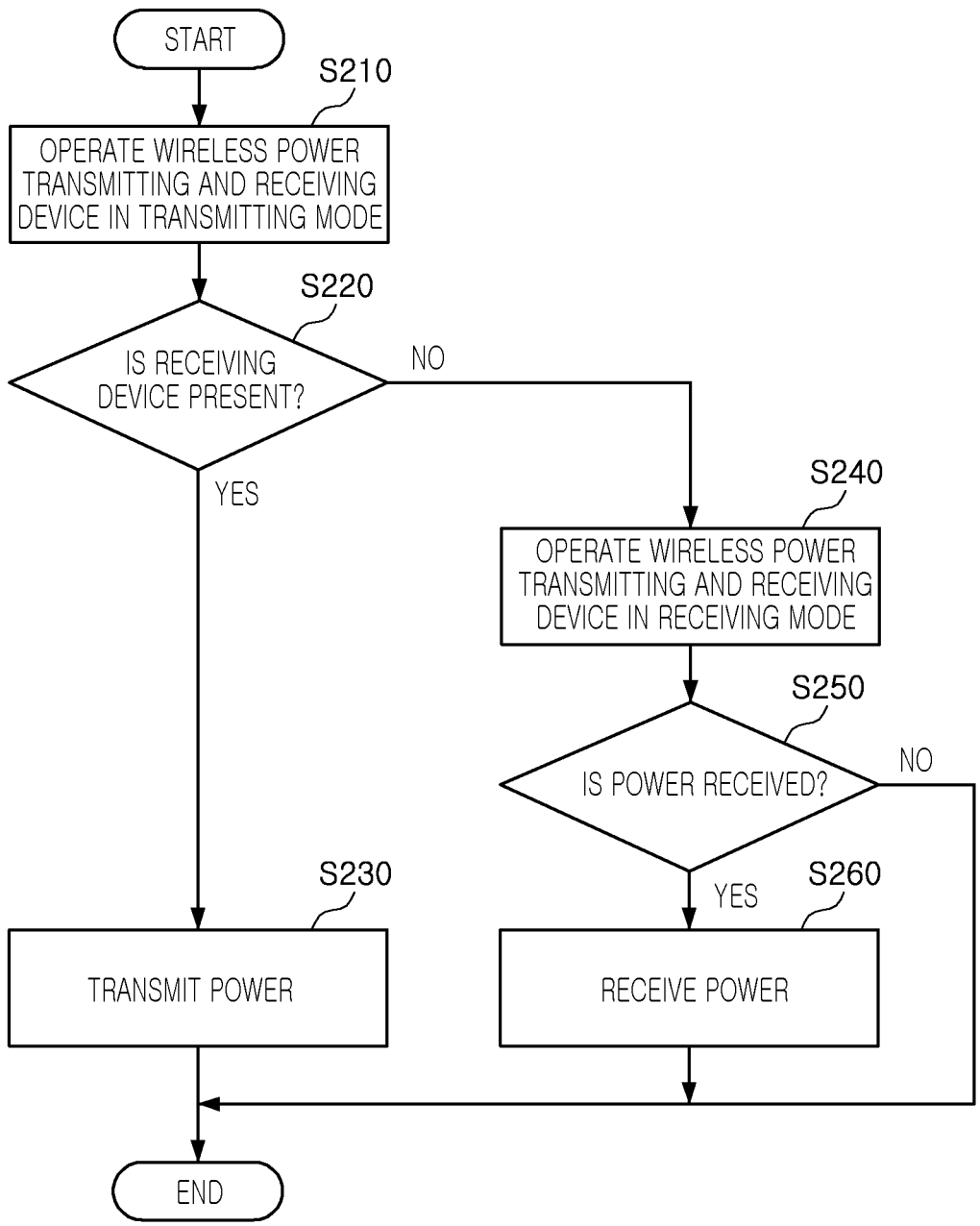

FIG. 26 is a flowchart illustrating an example of a method of operating a wireless power transmitting and receiving device. Operations of FIG. 26 may be performed by the control unit 140, 141, 142, 143, 144, 145, or 146 of FIG. 6, 7, 10, 13, 16, 19, or 22, respectively.

A control unit may control the wireless power transmitting and receiving device to operate in a transmitting mode (step S210).

Next, the control unit may determine whether a wireless power receiving device is present (step S220). In step S220, the control unit may determine whether the wireless power receiving device is present by outputting a signal through a transmitting and receiving coil of the wireless power transmitting and receiving device or a separate coil (or an antenna), etc. and then detecting a change in impedance of the transmitting and receiving coil or determining whether a response signal is received with respect to the predetermined signal, etc.

As a result of determination in step S220, if it is determined that the wireless power receiving device is present, the control unit may control the wireless power transmitting and receiving device to operate in the transmitting mode and transmit power wirelessly (step S230). The control unit may output control signals as shown in FIG. 8, 11, 14, 17, 20, or 23, thereby controlling the wireless power transmitting and receiving device to operate in the transmitting mode and transmit the power wirelessly.

As a result of determination in step S220, if it is determined that the wireless power receiving device is not present, the control unit may control the wireless power transmitting and receiving device to operate in a receiving mode (step S240).

Next, the control unit may determine whether the received power is greater than a reference value (step S250). The control unit may determine whether the received power is greater than the reference value based on a magnitude of voltage of both ends of the transmitting and receiving coil or a rectified voltage.

As a result of determination in step S250, if it is determined that the received power is more than the reference value, the control unit may control the wireless power transmitting and receiving device to operate in the receiving mode and receive power (step S260). The control unit may output control signals as shown in FIG. 9, 12, 15, 18, 21, or 24, thereby controlling the wireless power transmitting and receiving device to operate in the receiving mode and receive power.

As a result of determination in step S250, if it is determined that the received power is below the reference value, the control unit may end an operation.

The control unit may periodically repeat steps S210 through S250 of FIG. 26.

As set forth above, a wireless power transmitting and receiving device and an apparatus including the wireless power transmitting and receiving device may use wireless power transfer technology without being limited by location. Further, a device and/or an apparatus that may transmit wireless power and may receive wireless power receiving may be inexpensively and simply implemented.

The apparatuses, units, modules, devices, and other components illustrated in, for example, FIGS. 1, 5-7, 10, 13, 16, 19, and 22, that perform the operations described herein with respect to FIGS. 1, 5-7, 10, 13, 16, 19, and 22, are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1, 5-7, 10, 13, 16, 19, and 22. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 25 and 15 that perform the operations described herein with respect to FIGS. 25 and 26 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art, after understanding the present specification, can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a device/apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitting and receiving device, comprising:
   a coil comprising:
      a first section configured to receive power; and
      a second section different from the first section and configured to transmit power; and
   a converting and rectifying unit configured to:
      rectify the power received through the coil;
      convert externally-supplied power into alternating current power; and
      apply the alternating current power to the coil.

2. The wireless power transmitting and receiving device of claim 1, wherein the first section includes the second section.

3. The wireless power transmitting and receiving device of claim 1, wherein:
   the converting and rectifying unit is electrically connected to ends of the coil in a receiving mode in which the power is received by the coil; and
   the converting and rectifying unit is electrically connected to a first end of the coil and a tab disposed between the ends of the coil in a transmitting mode in which the power is transmitted by the coil.

4. The wireless power transmitting and receiving device of claim 1, wherein the coil comprises:
   a first terminal electrically connected to the converting and rectifying unit in a receiving mode in which the power is received by the coil and in a transmitting mode in which the power is transmitted by the coil;
   a second terminal electrically connected to the converting and rectifying unit in the receiving mode; and
   a third terminal electrically connected to the converting and rectifying unit in the transmitting mode and disposed between the first terminal and the second terminal.

5. The wireless power transmitting and receiving device of claim 4, further comprising:
   a first switch electrically connected to the second terminal, configured to be turned on in the receiving mode and turned off in the transmitting mode;
   a first capacitor electrically connected between the first switch and a first node;
   a second capacitor electrically connected between the first node and the first terminal;
   a second switch electrically connected to the third terminal, configured to be turned off in the receiving mode, and turned on in the transmitting mode; and
   a third capacitor electrically connected between the second switch and a second node.

6. The wireless power transmitting and receiving device of claim 5, wherein the converting and rectifying unit comprises:
   a rectifying unit electrically connected between the first node and the first terminal and, in the receiving mode, configured to rectify a voltage; and
   a converting unit electrically connected between the second node and the first terminal, and, in the transmitting mode, configured to convert a voltage of externally-supplied power into alternating current voltage, and configured to output the alternating current voltage to the second node and the first terminal.

7. The wireless power transmitting and receiving device of claim 6, wherein the converting unit comprises:
   a first transmission transistor electrically connected between a third node to which the externally-supplied power is supplied and the second node and configured to be turned on and off periodically;
   a second transmission transistor electrically connected between the second node and a ground and configured to be turned on and off complementarily to the first transmission transistor;
   a third transmission transistor electrically connected between the third node and the first terminal and configured to be turned on and off simultaneously with the second transmission transistor; and
   a fourth transmission transistor electrically connected between the first terminal and the ground and configured to be turned on and off simultaneously with the first transmission transistor.

8. The wireless power transmitting and receiving device of claim 6, wherein the rectifying unit comprises:
   a first reception transistor electrically connected between a third node to which the rectified voltage is applied and the first node, and configured to be turned on if a magnitude of current flowing from the coil to the rectifying unit is greater than a first value, and turned off if the magnitude of the current is less than a second value;

a second reception transistor electrically connected between the first node and a ground, configured to be turned on if the magnitude of the current flowing from the coil to the rectifying unit is less than a third value, and turned off if the magnitude of the current is greater than a fourth value;

a third reception transistor electrically connected between the third node and the first terminal and configured to be turned on and off simultaneously with the second reception transistor; and a fourth reception transistor electrically connected between the first terminal and the ground and configured to be turned on and off simultaneously with the first reception transistor.

9. The wireless power transmitting and receiving device of claim 4, further comprising:

a first capacitor electrically connected to a first node;

a second capacitor electrically connected between the first node and the first terminal; and a switch configured to electrically connect the first capacitor to the second terminal in the receiving mode and electrically connect the first capacitor to the third terminal in the transmitting mode.

10. The wireless power transmitting and receiving device of claim 9, wherein the converting and rectifying unit comprises:

a bridge circuit electrically connected to the first node and the first terminal, configured to:

rectify a voltage between the first node and the first terminal and output the rectified voltage in the receiving mode; and convert a voltage of externally-supplied power into alternating current voltage and output the alternating current voltage to the first node and the first terminal in the transmitting mode;

a voltage regulator configured to receive the rectified voltage and output a charging voltage in the receiving mode; and a switch device electrically connected to the voltage regulator in parallel, configured to be turned on in the transmitting mode, and transfer the externally-supplied power to the bridge circuit.

11. The wireless power transmitting and receiving device of claim 10, wherein the bridge circuit comprises:

a first transmission and reception transistor electrically connected between the first node and a second node to which the rectified voltage is configured to be output;

a second transmission and reception transistor electrically connected between the first node and a ground;

a third transmission and reception transistor electrically connected between the second node and the first terminal; and a fourth transmission and reception transistor electrically connected between the first terminal and the ground.

12. The wireless power transmitting and receiving device of claim 11, wherein:

in the transmitting mode:

the first transmission and reception transistor and the fourth transmission and reception transistor are configured to be turned on and off simultaneously;

the second transmission and reception transistor and the third transmission and reception transistor are configured to be turned on and off simultaneously; and the first transmitting and receiving transistor and the second transmitting and receiving transistor are configured to be turned on and off complementarily with each other; and in the receiving mode:

the first transmission and reception transistor and the fourth transmission and reception transistor are configured to be turned on and off simultaneously;

the second transmission and reception transistor and the third transmission and reception transistor are configured to be turned on and off simultaneously;

the first transmission and reception transistor is configured to be turned on if a magnitude of current flowing from the coil to the converting and rectifying unit is greater than a first value and turned off if the magnitude of the current is less than a second value; and the second transmission and reception transistor is configured to be turned on if the magnitude of the current flowing from the coil to the converting and rectifying unit is less than a third value and turned off if the magnitude of the current is greater than a fourth value.

13. The wireless power transmitting and receiving device of claim 1, wherein the second section includes the first section.

14. The wireless power transmitting and receiving device of claim 1, wherein:

the converting and rectifying unit is:

electrically connected to ends of the coil in a receiving mode in which the power is received;

electrically connected to a tab disposed between the ends of the coil; and is configured to apply alternating current power to a first end of coil and the tab using boosted power obtained by boosting externally input power in a transmitting mode in which the power is transmitted wirelessly.

15. An apparatus, comprising:

a coil comprising:

a first section configured to receive power; and a second section different from the first section and configured to transmit power;

a converting and rectifying unit configured to:

rectify the power received through the coil;

convert externally-supplied power into alternating current power; and apply the alternating current power to the coil; and a power unit configured to:

receive charging power output by the converting and rectifying unit and store electrical power in a receiving mode in which the power is received by the coil; and supply the power to the converting and rectifying unit in a transmitting mode in which the power is transmitted by the coil.

16. The apparatus of claim 15, wherein the first section includes the second section.

* * * * *